United States Patent [19]
Petersen

[11] Patent Number: 5,805,588
[45] Date of Patent: Sep. 8, 1998

[54] CIRCUIT EMULATING EXCHANGE USING MICRO CELLS

[75] Inventor: Lars-Göran Petersen, Tumba, Sweden

[73] Assignee: Telefonaktiebolaget LM Ericson, Stockholm, Sweden

[21] Appl. No.: 459,127

[22] Filed: Jun. 2, 1995

[30] Foreign Application Priority Data

Jun. 13, 1994 [SE] Sweden ................................. 9402051

[51] Int. Cl.$^6$ .................................................. H04L 12/56
[52] U.S. Cl. ........................ 370/356; 370/395; 370/469; 370/474
[58] Field of Search ................................. 370/60.1, 94.2, 370/85.13, 79, 82, 99, 110.1, 352, 356, 391, 395, 465, 469, 474

[56] References Cited

U.S. PATENT DOCUMENTS 5,422,882 6/1995 Hiller et al. ............................ 370/60.1
5,513,127 4/1996 Gard et al. ............................ 364/514 C

*Primary Examiner*—Douglas W. Olms
*Assistant Examiner*—Min Jung
*Attorney, Agent, or Firm*—Burns, Doane, Swecker & Mathis, L.L.P.

[57] ABSTRACT

A method for switching synchronous transfer mode cells in a circuit emulated ATM switch using a layered protocol model. Each cell is delivered to the circuit emulated ATM switch on a frame oriented basis and each such cell comprises a header and a payload. The header comprises fields storing details about the cell. The payload comprises time slots carrying user data. The ATM switch is provided with means for assigning a predetermined number of time slots to a cell that is transported on a physical medium. The cell, referred to as a PR-PDU-cell, can have any of a number of sizes ranging from 4, 8, 12, 16, 20, 56 and 60 octets. This reduces the packetizing time of a cell.

25 Claims, 24 Drawing Sheets

| Circuit description | | Virtual channel descriptions | | | Virtual path descriptions | | | | Physical route descriptions | | |
|---|---|---|---|---|---|---|---|---|---|---|---|
| CC-trail | | VC-trail | VCLC | VCI | VP-trail | VPLC | VPI | PR-trail | PRLC | PRI |
| 1 (T5–T4) | | 1 (AU3–AU1) | AU3–MU1 | 1 | 1 (AU3–MU1) | AU3–MU1 | 2 | 1 (AU3–MU1) | AU3–AS1 | 1 |
| | | | | | | | | | AS1–MU1 | 2 |
| | | | MU1–AU1 | 2 | 2 (MU1–AU1) | MU1–MU4 | 2 | 3 (MU1–MU4) | MU1–CS1 | 1 |
| | | | | | | | | | CS1–MU4 | 2 |
| | | | | | | MU4–AU1 | 2 | 4 (MU4–AU1) | MU4–AS4 | 1 |
| | | | | | | | | | AS4–AU1 | 2 |
| 2 (T6–T8) | | 2 (AU4–AU1) | AU4–MU1 | 1 | 3 (AU4–MU1) | AU4–MU1 | 2 | 1 (AU4–MU1) | AU4–AS1 | 1 |
| | | | | | | | | | AS1–MU1 | 3 |
| | | | MU1–AU1 | 3 | 2 (MU1–AU1) | MU1–MU4 | 2 | 1 (MU1–MU4) | MU1–CS1 | 1 |
| | | | | | | | | | CS1–MU4 | 2 |
| | | | | | | MU4–AU1 | 2 | 1 (MU4–AU1) | MU4–AS4 | 1 |
| | | | | | | | | | AS4–AU1 | 2 |

Fig 10

CIRCUIT EMULATING EXCHANGE USING MICRO CELLS

TECHNICAL FIELD

The present invention relates to a method of switching messages divided into micro cells of variable length and to facilities

BACKGROUND ART

EP-A1-528 085 relates to a combined ATM and STM network using standard ATM cells as well as non-standard short cells for transmission of information. Short cells are used in order to reduce the packetizing time as well as the depacketizing time. By reducing the packetizing and depacketizing times the loop delay is reduced thereby eliminating the need of echo cancelers. Standard ATM cells, comprising 53 octets, are used whenever a connection is set up from a STM switch to an ATM switch via an intermediate ATM switch using standard ATM transmission protocols. Short cells comprising a fraction, about ⅓, of the number of octets of the standard ATM cell, is used whenever a connection is set up between a STM switch and another STM switch via a ATM switch so as to reduce the packetizing and depacketizing time of the information cells within said latter, intermediate ATM switch.

In this known system the transmission capacity, i.e. the band width efficiency i.e. the coefficient between the number of octets of the header of the cell and the number of octets of the payload of the cell is about 25% which is rather fair provided all octets of the payload are used for information transfer. If for example half of the octets are empty the packetizing and depacketizing time will be the same, the bandwidth efficiency will also be the same but the packetizing degree, i.e. quotient of the number of octets of the header and the number of information loaded octets of the payload, is reduced. If small amounts of information are to be sent at irregular intervals, or if large amounts of information are to be sent at irregular intervals this known device will provide a low packetization degree, which in principle means a bad use of the existing bandwidth.

DISCLOSURE OF THE INVENTION

The object of the present invention is to provide a telecommunication network and network entities with flexible cell size adapting itself to the type of information to be sent while simultaneously providing small packetizing and depacketizing delays, a high band width efficiency and optimum packetizing degree.

Another objection of the present invention is to provide a telecommunication system and system entities therefore allowing the cell size to be changed during run-time.

Still another object of the invention is to provide a new hierarchy of protocol layers including a physical route layer PR-layer), a virtual path layer (VP-layer), a virtual channel layer (VC-layer) and a circuit connection layer (CC-layer). The use of a physical route layer in the protocol model will allow the use of spatial ATM-switches switching at the physical route layer.

Still another object of the invention is to reduce jitter of the cells by providing a new method to put a number of VC-PDU-cells in the VP-PDU part of a larger PR-PDU-cell. Said VC-PDU-cells have either the same virtual path VP or, in case ATM-cells are switched, the same virtual path and the same virtual connection.

Still another object of the invention is to provide the telecommunication system and system entities therein using switches and mapping units supporting the protocol in accordance with the invention.

These and other objects of the inventions will be described in detail below in connection with the enclosed drawings.

BRIEF DESCRIPTION OF THE DRAWINGS

FIG. 10 is a table showing the identifier assignment of the cells shown in FIG. 11.

DESCRIPTION OF PREFERRED EMBODIMENTS OF THE INVENTION

Standard TDM (Time Division Multiplex) switching requires that timing information is carried implicitly with the time slots. In particular the time slot position in the frame provides this timing formation, i.e. the connection with which the time slot is associated. The TDM technique is used to carry delay sensitive information, e.g. 64 kbps (kilobit per second) digitized speech.

For a 64 kbps connection a time slot is transferred once every 125 μs. The time interval of 125 μs is referred to as a frame.

A new technique to carry information across a telecommunication network is to use ATM (Asynchronous Transfer Mode) technique. The ATM technique has a potential to utilize network resources efficiently by allowing excessive and dynamically not used bandwidth to be used in delay insensitive applications like data communications. Another important benefit of ATM is that it allows the building of compact and efficient switches at a fraction of the hardware required for STM (Synchronous Transfer Mode) switches. In the following description the term STM is equal to TDM and will therefore be used. The ATM technique is also simpler because it requires no timing information.

Current ATM standards require that user data are put in cells which contain up to 48 octets. An ATM-cell can be used to carry time sensitive applications, such as for example speech. This technique is referred to as circuit emulation on ATM. Circuit emulation on ATM requires the STM timing information to be restored at the ATM-network edges.

A standardized service supporting circuit emulation is referred to as AAL1 by CCITT. The AAL1 standard defines that 47 octets of the payload of a cell comprising 48 octets be used for time slots. If AAL1 is used to carry time slots of a 64 kbps connection it will cause a packetizing delay of about 6 ms (47Φ125 μs). This will add to a loop delay of 12 ms. The packetizing delay may therefore require the use of echo cancelers. In mixed ATM and STM networks echo cancelers must certainly be needed along voice connections. At every transition from ATM to STM and from STM back to ATM will cause an extra unpacking and packing respectively with additional delays.

An evolutionary change of existing telecommunication networks will most probably take place. A revolution with a rapid change of today's networks towards ATM is probably not likely because of the huge investments already made in existing STM technique.

The loop delay existing in ATM circuit emulation for 64 kbps connections in a mixed ATM and STM network with repeated packing and unpacking will most probably cause unacceptable delays from a quality point of view.

Figure 1:
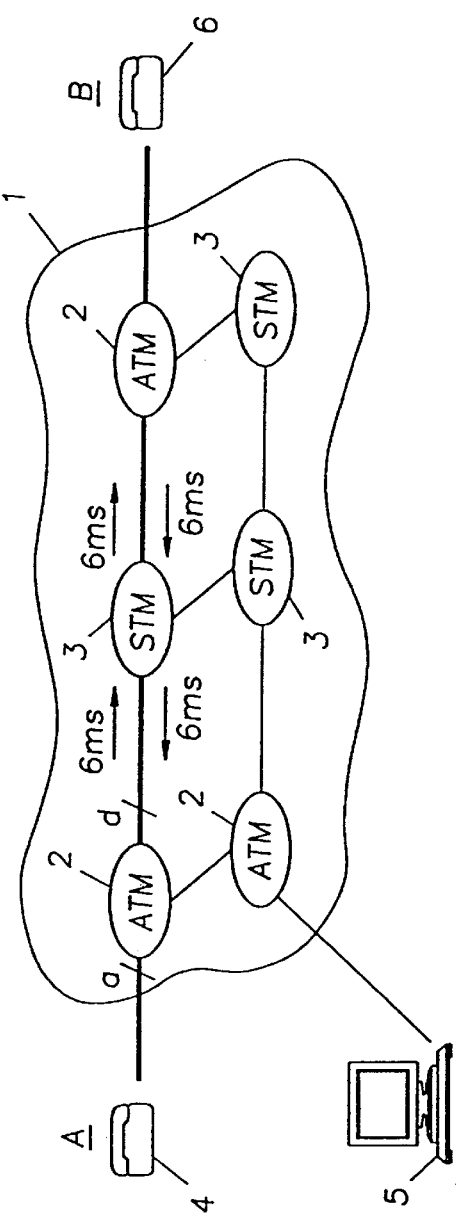
FIG. 1 is a schematic view of a mixed ATM- and STM-telecommunication network.

In FIG. 1 there is shown a mixed ATM and STM telecommunication network 1 comprising a number of ATM nodes 2 and a number of STM nodes 3. Each of the nodes 2 comprises an ATM switch and each of the nodes 3 comprises an STM switch. The nodes 2, 3 are interconnected by trunks represented by the indicated solid lines. To each of the nodes 2, 3 a number of users are connected. In FIG. 1 a user A having a telephone 4 and a data terminal 5 has access to the network 1 at the ATM node 2 to the left, while a second user B disposing of a telephone has access to the same network at the leftmost ATM node 2. The 6 ms delay caused by packetizing or depacketizing at each ATM to STM transition has been indicated at the upper STM node 3. If user A speaks over the phone with user B the speech of user A will be delayed by 24 ms. In a big network it is likely that several more transitions will occur leading to unacceptable long delays.

Figure 2:
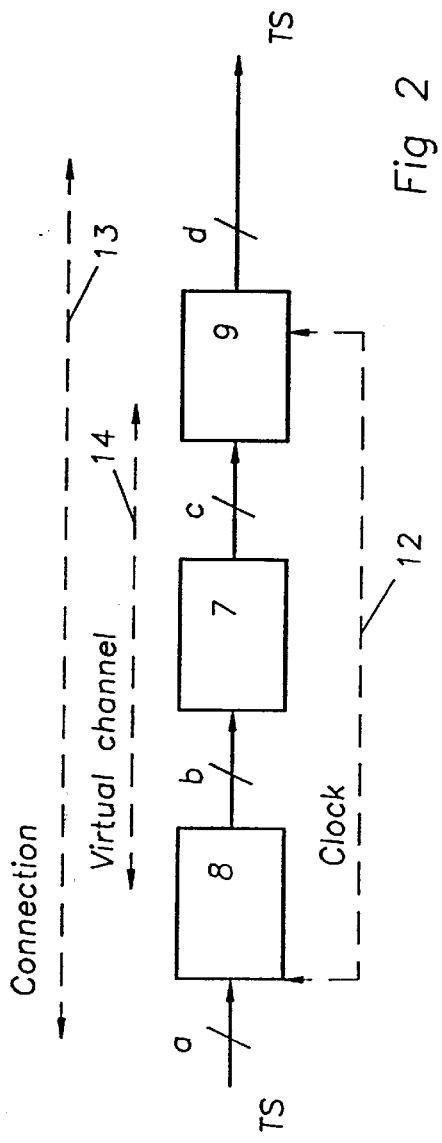
FIG. 2 is a block diagram showing an ATM node in the mixed network of FIG. 1.

FIG. 2 is a block diagram showing the ATM node 2 of FIG. 1 to which user A is connected. Reference point "a" is an STM input port receiving a number of time slots which are cyclically repeated each 125 μs, i.e. on a frame basis. Reference point "d" is an STM output port transmitting the same time slots on a frame basis. Reference points "a" and "d" have also been indicated in FIG. 1. The ATM node in FIG. 2 comprises a switch fabric 7, a cell assembly unit 8 and a time slot restore unit 9.

Figure 3:
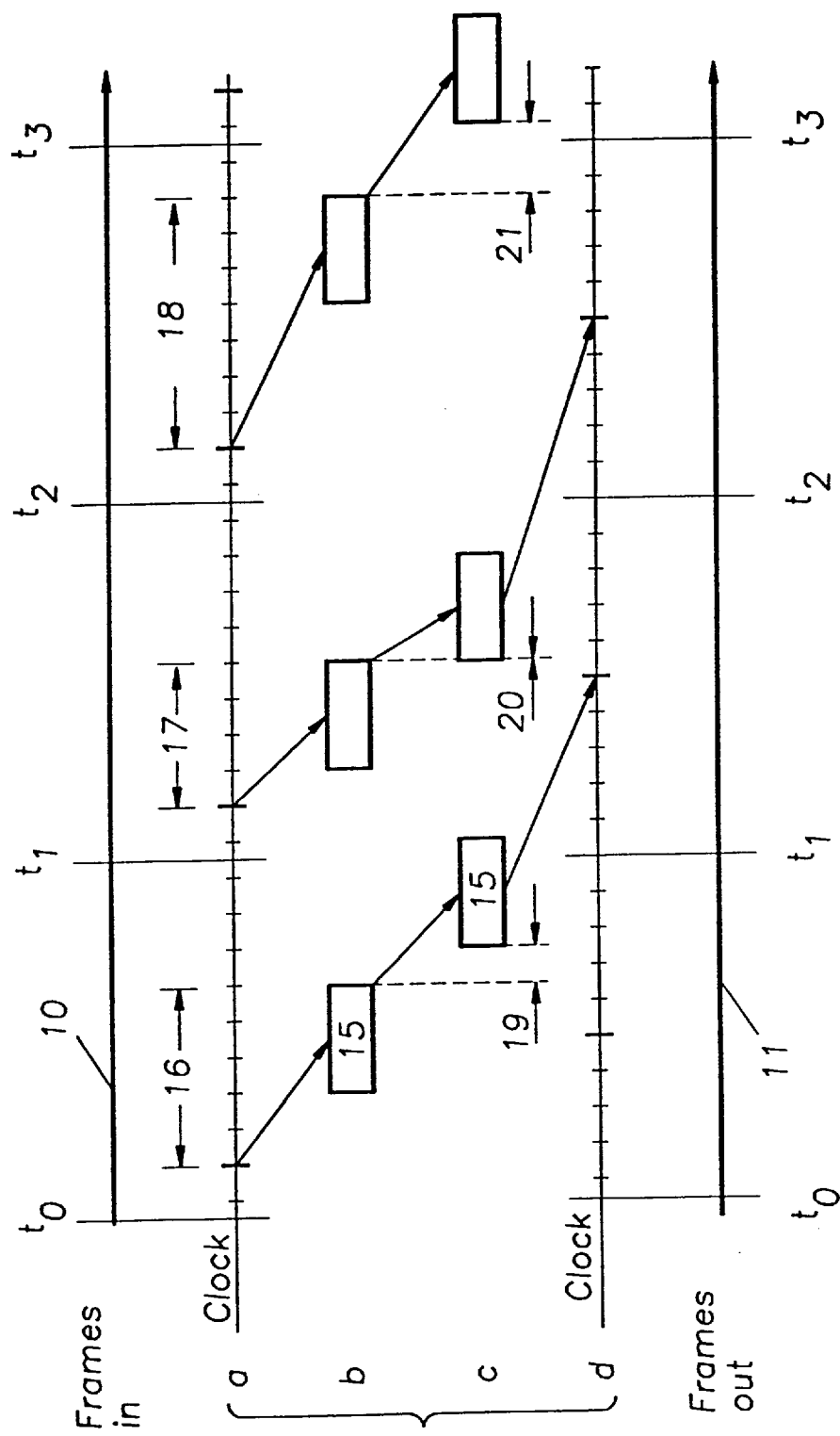
FIG. 3 is a simplified timing diagram showing the circuit emulation principle.

Next, the circuit emulation principle will be described with reference to FIGS. 2 and 3. It is assumed that users A and B are connected to each other. FIG. 3 is a simplified timing diagram showing the circuit emulation principle with reference to FIG. 2. A first time axes 10 is illustrating the clock at reference point "a" and time axes 11 is showing the clock at reference point "d". The clock at "a" is not synchronized with the clock at "b". The timing of the time slot at "a" is however restored at reference point "d" as is illustrated by arrow 12 shown in broken lines in FIG. 2 and by the time axes 10, 11 in FIG. 3. Each interval T0, T1, T2 . . . at time axes 10, 11 represents 125 μs. During each such interval a predetermined number of time slots are generated. This predetermined number is the same from frame to frame. Each such time slot is represented by a small vertical mark. The time slots are numbered in succession and are repeated on a frame basis. The circuit is established between time slot 2 at reference point "a" and time slot 5 at reference point "d". This circuit is represented by the double headed, dashed arrow 13 in FIG. 2. Each time slot number 2 at "a" is put in an STM-cell containing a virtual channel number. The virtual channel is represented by doubled headed arrow 14 in FIG. 2. This is done in cell assembly unit 8. The STM-cell is sent into the switch fabric 7 at reference point "b" when the input line is free. The input line can be occupied by other cells having other destinations. The STM cell is indicated at 15 at reference point "b" in FIG. 3. In the switch fabric 7 a virtual channel route is set up at circuit establishment. The switch fabric unit 7 will then route the STM-cell 15 to the reference point "c". All routing information are contained in the STM-cell by means of the virtual channel number.

Inside the switch fabric 7 the STM-cell is transferred asynchronously. This means that the time it takes the cell to traverse the switch fabric is dependent on various parameters such as the internal rate of the switch fabric, the traffic load of the switch fabric. The STM-cell 15 leaves the switch fabric 7 at reference point "c". The transfer time from point "b" to "c" may vary from cell to cell belonging to the same connection due to the above indicated parameters.

At reference point "c" the STM cell 15 has traversed the switch domain and the timing information of the time slot is restored by the clock used at the time slot restore unit 9. Time slot number 2 is inserted in the time slot stream at the position of time slot number 5 at reference point "d". The virtual channel is associated to time slot 5 in a channel-to-circuit conversion table not shown.

Since the STM-cell transfer time can vary the time slot restore unit 9 must have a time slot buffer sufficiently large to accommodate the delay variation also referred to as jitter. If not, loss of time slots can be expected. Cell delay is also generated at the input and output ports of the switch fabric 7, i.e. at reference point "b" and "c" respectively. A separate clock at time slot restore unit 9 is required to restore the time slots at "d". There is, however, no need to carry frame synchronization information in the cells. The clock is needed only to provide time slot synchronization so as to avoid loss of time slots. It should be noted that between reference points "b" and "c" cells are transported asynchronously without no timing relation in relation to frames. The cells, however, comprises time slots, each time slot being one octet.

In FIG. 3 the time it takes to compose a cell 15 and to send it away, is called the packetizing time, is indicated by the double headed arrow 16 in the first frame T0-T1, by the double headed arrow 17 in the second frame T1-T2 and by the double headed arrow 18 in the third frame T2-T3. Since the switch fabric 7 is an ATM type switch the cells will propagate through the switch fabric asynchronously an will not arrive to the reference point licit regularly. Instead the cells 15 will arrive at reference point "c" with various degrees of delay, jitter, as is schematically indicated by the double headed arrows 19, 20 and 21 respectively.

It is important to provide sufficient buffering capacity in the time slot restore unit 9 in order to maintain the order, with respect to time, in which the cells arrive at the time slot restore unit 9. A cell from a previous frame must never be decomposed into time slots after the decomposition of a cell from a succeeding frame.

Accordingly, the time relationship between individual frames must never be reversed. This poses a problem which will be addressed later on.

Figure 4:
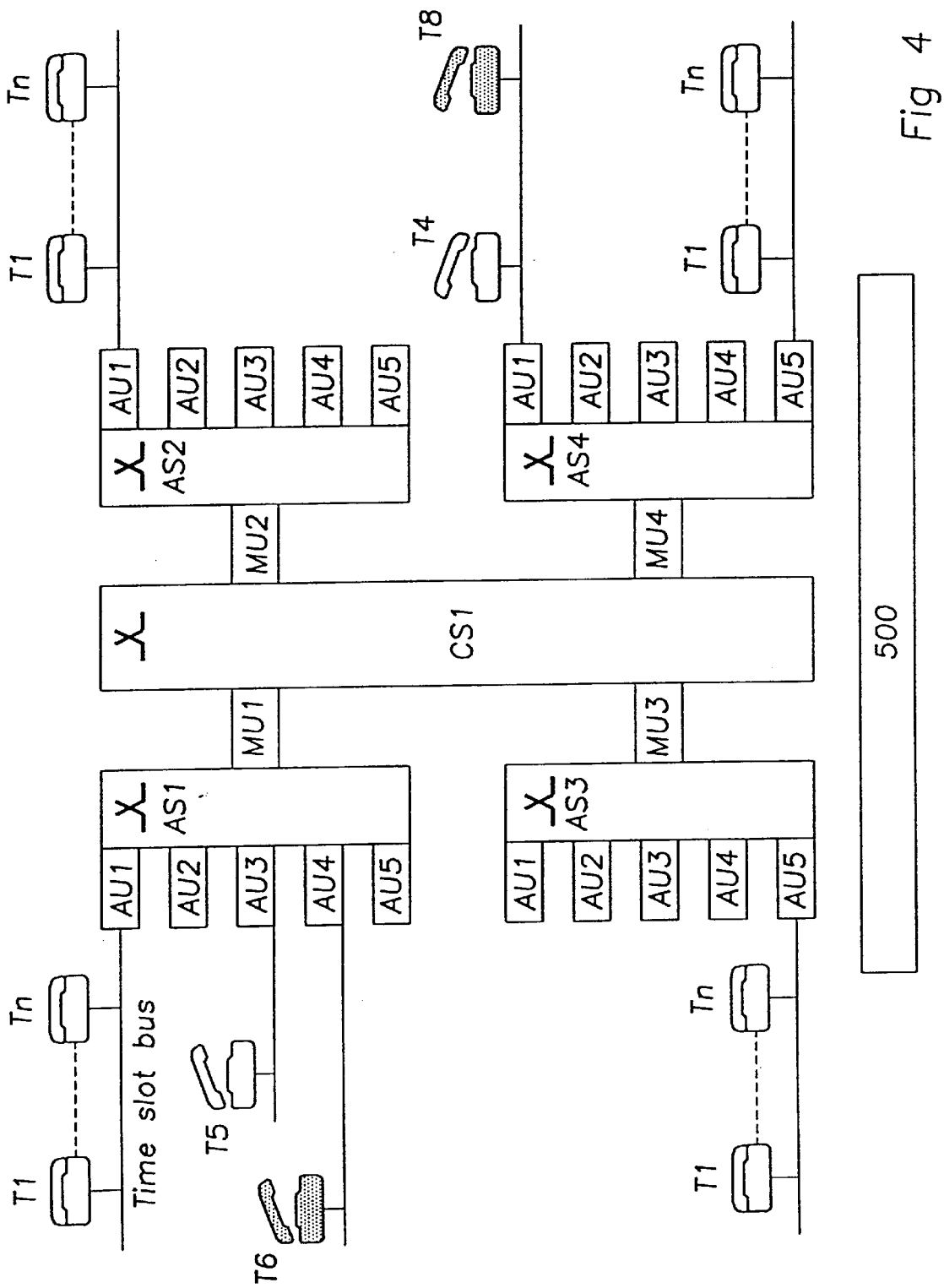
FIG. 4 is a block diagram showing the an ATM switch node of FIG. 1.

In FIG. 4 the topology of an ATM switch node 2 is shown. The node comprises four access switches labeled AS1–AS4 and a central switch CS1. The interconnection between the access switches AS1–AS4 and the central switch CS1 are handled by mapper units MU1–MU4. Each access switch comprises five access units AU1–AU5. To each access unit telephone sets T1-Tn, n=being an integer, are connected. As an example access switch AS1 is an extension module ATM switch serving a building with condominium apartments. The number of access units, five in the illustrated example, is only exemplary and may vary from access switch to access switch. The number of telephone sets connected to an access unit may typically be 24. The number of access switches connected to the central switch, four in the illustrated example, is only exemplary and may be different. Preferably the central switch CS1 is of the type described in my U.S. patent application Ser. No. 08/011378 filed on Jan. 29, 1993. A central controller 500 is supervising the traffic in the node and performs signalling in order to set up, or controls signalling units that set up, a connection between two users, is supervising the traffic in the node and is deciding, on a run-time basis, the cell type and the cell size to be used for an individual connection, said decision being based on traffic analyses, user demand or other criterions such as geographical position of a switch unit in the ATM-node.

In FIG. 4 telephone set T5 at AU3 in AS1 has established a circuit to telephone set T4 in access unit AU1 at AS4. A circuit is depicted by the "hook off" telephone symbol. The circuit can be defined as:

T5×AU3×AS1–T4×AU1×AS4.

Moreover, telephone set T6 at AU4 at access switch AS1 has established a circuit to telephone set T8 at AU1 at access switch AS4. The circuit is depicted by the "hook off" shaded telephone symbols. This circuit can be defined as:

T6×AU4×AS1–T8×AU1×AS4.

Looking at the node topology model it is apparent that the two circuits partly traverses the same distances.

Each access unit generates n time slots per frame, one time slot being allocated to each of the telephone sets T1-Tn. Perhaps four different telephone sets are busy at the same time. The audio signal at each telephone set is sampled 8000 times per second. If the quantisation distortion requires each sample to be housed in 8 bits, the bit rate must be 64 kbps. In accordance with standard TDM switching a sample is transmitted each 125 $\mu$s. Accordingly, each sample is stored in the time slot and the time slot comprises 8 bits, a so called octet. In the case of transferring speech the bit rate is 64 kbps. In other applications, such as data transmission, other higher bit streams are used. Independently of which bit stream is used the time period of 125 $\mu$s is referred to as a frame.

In the exemplary ATM switch node of FIG. 4 each access unit generates n time slots per frame. Numbering the time slots in order, time slot T1 is allocated to telephone set T1, time slot T2 to telephone set T2 etc.

If the switch fabric 7 has a standard ATM switch fabric the ATM cell payload comprises 48 samples. Suppose only one telephone set is busy and that the speech signal is sampled at each 125 $\mu$s. It would then take 48×125 $\mu$s to fill, that is to packetize, the ATM cell. As discussed above such long paketizing time is unacceptable in mixed ATM and STM networks. Still supposing standard ATM cells are used and that only one telephone set is busy in a access unit one way to shorten the paketizing time would be to send an ATM cell as soon as a sample has been taken, thus ignoring to fill the following 47 samples. Accordingly 47 octets of the standard ATM cell would be transmitted empty. This proposed solution is, however, unacceptable in view of the waste of bandwidth since the bit rate in this case would be 64 kbps×53=about 3.4 Mbps (provided that 53 time slots should be transmitted each 125 $\mu$s).

Figure 12:
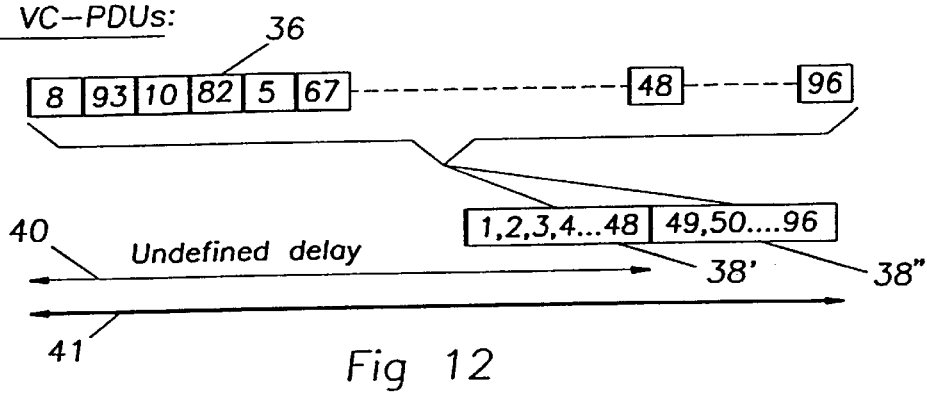
FIG. 12 is time diagram used in explaining jitter of micro cells at a switch entity shown in FIG. 4.

Accordingly there is a need to keep the packetizing time as short as possible while simultaneously avoiding waste of bandwidth. If the packetizing time is reduced the waste of bandwidth is increased while on the other hand if the packetizing time is low the bandwidth will be used maximally. In accordance with the invention it is suggested that the number of time slots per cell should be reduced from the 53 time slots of a standard ATM cell to a any of the following sizes: 4, 8, 12, 16 and 20 octets. Such short cells are referred to as micro cells. In accordance with the invention, and for reasons explained in connection with FIGS. 12 and 13, also larger cell sizes may be used, preferably any of the following cell sizes: 56 and 60 octets. Such large cells cannot be termed micro cells. As a common name for cells having any of the listed sizes (4, 8, 12, 16, 20, 56 and 60 octets) are referred to as PR-PDU-cells. PR-PDU-cells of any of these sizes, or combinations thereof, may be switched at the same time through one and the same ATM-node 2. In accordance with the invention the cell size is set at the access units by the central controller 500 and may be changed at a mapping unit so as to comply with the above mentioned trade off between low packetizing time and efficient bandwidth use.

Figure 5:
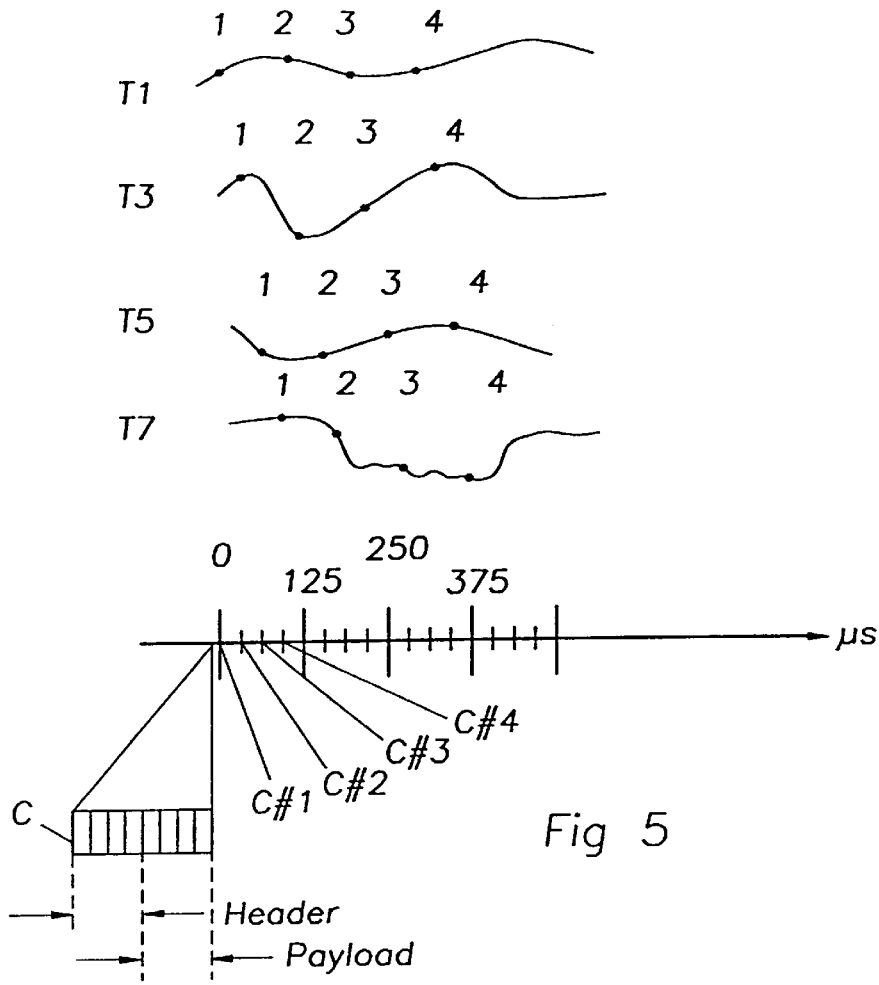
FIG. 5 is used to explain micro cell assembly and is showing various wave forms and a time axis.
Figure 6:
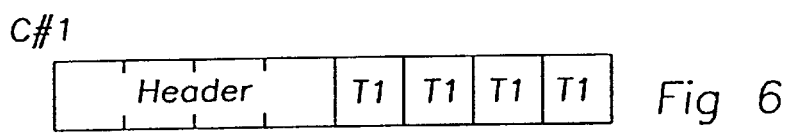
FIG. 6 is showing a micro cell of a first type in accordance with the invention.

In FIG. 5 a micro cell C in accordance with the invention is shown. The header of the cell comprises 4 octets and the payload P of the cell comprises 4 time slots giving a micro cell size of 8 octets. Each long, thin vertical mark at the time axis represents a frame and each small, thick vertical mark represents a micro cell. Audio wave forms at telephone sets T1, T3, T5 and T7, which all belong to the same access unit, are shown in the upper part of the Figure. The circles at the wave forms represent different times at which samples of the speech are taken. In the illustrated example 4 micro cells are sent at each 125 μs. The micro cells are numbered 1, 2, 3 and 4. Cell No. 1 belongs to telephone set T1, cell No. 2 to telephone set T3, cell No. 3 to telephone set T5 and cell No. 4 to telephone set T7. Since the payload of each such micro cell comprises 4 time slots it takes 4×125 μs to fill cell No. 1. Accordingly the packetizing time is 0,5 ms. It will also take 0.5 ms to fill cell No. 2, cell No. 3 and cell No. 4. The added loop delay, compared to STM, will in this case be 1 ms instead of 12 ms for ATM. The structure of cell No. 1 is shown in FIG. 6. The cell has a header H and four time slots in which four samples are stored. These samples belong to one and the same telephone set T1. Accordingly one cell carries one connection. It will thus take 4 frames until the cell is filled. In accordance with an alternative embodiment of the invention shown in FIG. 7 the telephone set T1 is allocated time slot 1 in cell No. 1, telephone set T3 is allocated time slot 2 in the same cell No. 1, telephone set T5 is allocated time slot T3 in the same cell No. 1, and telephone set T7 is allocated time slot 4 in cell No. 1. In cell No. 1 in the next frame shown in FIG. 8 telephone set T1 is still allocated time slot T1, telephone set T3 time slot 2, telephone set T5 time slot 3 and telephone T7 time slot 4. The time slot order remains the same from frame to frame. In this case 4 different users are sharing the same cell. This will shorten the packetizing time 4 times compared to the embodiment shown in FIG. 6. The loop delay will accordingly be 4 times shorter, i.e. 250 μs.

Figure 8:
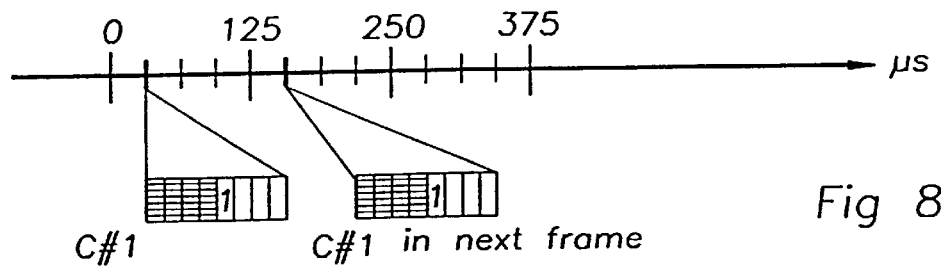
FIG. 8 is a time diagram showing the micro cells in a frame oriented manner.

In order to reduce the packetizing time of micro cell No. 1 in FIG. 6 were it takes four frames to fill the micro cell it is possible to transmit the micro cell as soon as the first sample is received and let remaining time slots be empty. This is shown in FIG. 8. This reduces the packetizing density and increases the waste of bandwidth.

From the above it is apparent that the smaller the size of the micro cell the shorter is the packetizing delay. However, the smaller the cell size the less is the useful utilization of a cell with regard to the length of the header. If the payload comprises four times time slots (=4 octets) and the header is four octets then only 50% of the cell is effectively used. In the embodiment shown in FIG. 8 only about 12% of the cell is effectively used. This should be compared to a standard ATM cell wherein about 90% is effectively used. Accordingly there is a value in having larger cells at the same time as there is a value in keeping the size of the payload small in order to reduce the packetizing time. This is a reason why different cell sizes are used in different parts of an ATM node 2 in accordance with the invention. It is preferred to use the small cell size at the access points to the ATM node while larger cell sizes are used in the central ATM-node. The central controller 500 decides which sizes that should be used.

Taking the above in consideration there is a trade off between acceptable waste of bandwidth, effective utilization of the cell and acceptable packetizing delays. The indicated cell lengths used by the PR-PDU-cells in accordance with the invention represent a fare compromise.

In order to reduce delay caused by jitter a new protocol model, bases on the same principle as the CCITT-OSI model regarding interfaces between layer and peer to peer communications is provided in accordance with the present invention. The CCITT-OSI terms are used to describe the protocol in accordance with the invention. To start with four distinct layers are identified in the switch node shown in FIG. 9 namely:

1. Physical route layer (PR-layer)
2. The virtual path layer (VP-layer)
3. The virtual channel layer (VC-layer)
4. The circuit connection layer (CC-layer) that interfaces to the user application.

Figure 9:
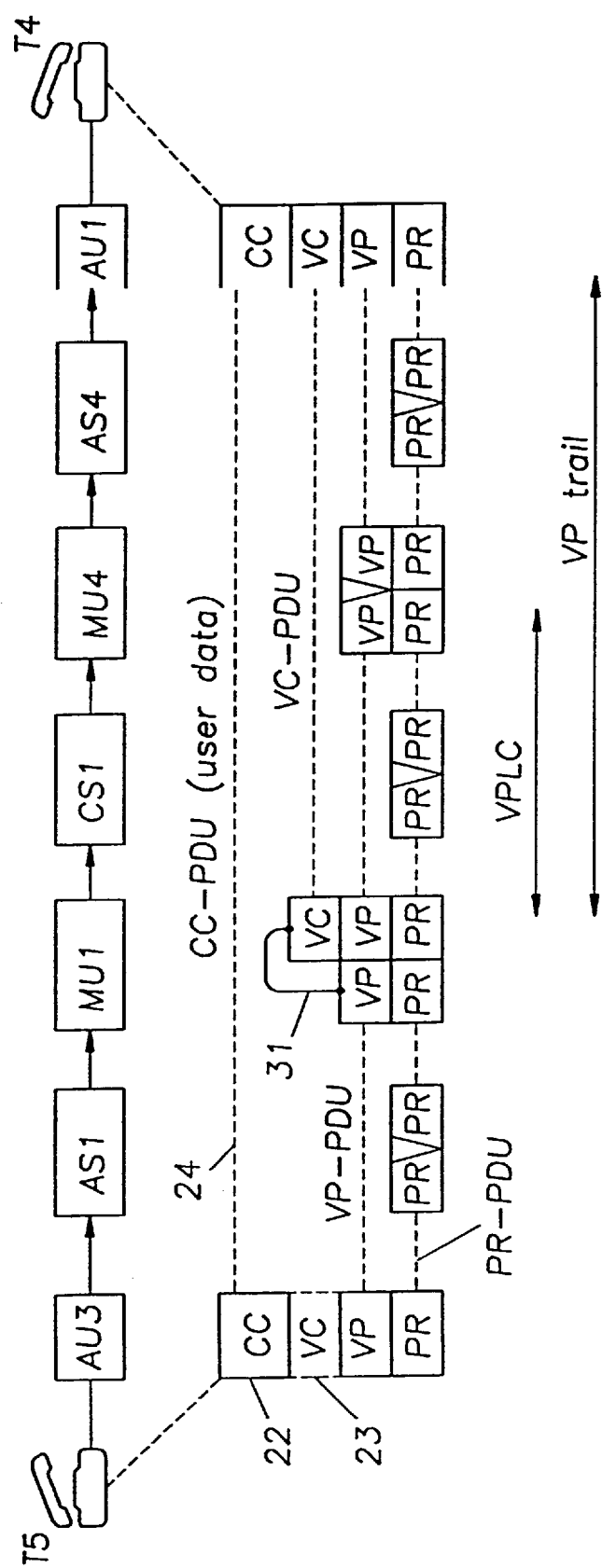
FIG. 9 is a diagram showing the layered protocol model in accordance with the invention.

Although FIG. 9 is described in connection with telephone sets it is apparent that other applications than telephony are conceivable such as mobile telephony, data transmission between computers, video networks etc. So, instead of a telephone set the more generic term user is used in the following.

The advantages with this layered model is that the lower layers (the PR-layer and VP-layer) can be set up more or less semipermanently. If this principle is used to its utmost a circuit can be set up by operating only at the edges of the network. The time required to establish a circuit from a management point of view is thus reduced considerably.

An established circuit through all the layers is defined as a circuit connection 24.

Applying the layered architecture above and introducing the well established definition of a Protocol Data Unit, PDU, for every layer this will imply that an STM-cell comprises:

1. A PR-PDU that is similar to the earlier defined STM-cell.

Note: the STM-cell has been redefined and is now a generic term for an assembled cell.

2. A VP-PDU that is the user data of the PR-PDU
3. A VC-PDU that is the user data of the VP-PDU
4. A CC-PDU that is the user data of the VP-PDU or the VC-PDU. The CC-PDU contains the time slot or time slots.

The PR-, VP- and CC-layers are only valid within the switch node. The CC-layer is the user data from the user of the node. The user data are carried across the node.

The switch controlled PDUs has a Protocol Control Information PCI and the user data. The PCI comprises essentially an identifier which makes it possible assemble and disassemble the protocols. A micro cell at various protocol layers will be described in detail in FIGS. 21–26.

Next there will be described how time slots from telephone set T5 traverses the ATM node 2 to telephone set T4 in accordance with the protocol model above. This connection is the same as shown in FIG. 4.

The time slot coming from telephone set T5 in FIG. 4 is given to the access unit AU3. On top of the protocol stack in FIG. 9 is the circuit connection layer 22. The user submits the time slot as a SDU, Service Data Unit, to the VC-layer 23 together with interface control information specifying the circuit connection 24 shown in dotted lines in FIG. 9. In this particular case said information is the time slot number in the frame, time slot 2.

The VC-layer 23 is not used in this particular case and is therefore short-cut down to the VP-layer. The VC-layer representation is implicitly present in the VP-layer. The VP-layer in its turn adds the VPI as PCI Protocol Control Information and hands over the VP-SDU to the PR-layer together with interface control information stating the physical route.

At the PR-layer AU3 adds the physical route identifier, PCI, and transfers the protocol data unit (the cell) to the peer entity at AS1. The AS1 bridges the cell to the physical route indicated by the physical route identifier PRI. The physical route identifier is also changed from a trail termination sink identifier to a trail termination source identifier.

At the peer to peer entities in mapper unit MU1 the procedures are repeated in the reversed order with respect to access unit AU3. At the VP-layer a bridging is made to the transmitting VC-layer side. This VP-VC-bridging is illustrated by line segment 31 in FIG. 9. The VC-layer attaches a VCI to the cell header and passes the now created VC-PDU down to the VP-layer as an VP-SDU. The same procedure as in the access unit AU3 is repeated; the VC-PDU is encapsulated in the VP-layer and the VP-PDU is encapsulated in the PR-layer and the cell, now being an PR-PDU-cell, is now sent to the central switch CS1.

At the central switch CS1 a similar procedure as that in access switch AS1 is performed.

At mapper unit MU4 the only that takes place is a bridging at the VP-layer. The incoming VPI and PRI uniquely define the new physical route. The VPI is normally changed but in this case it remains the same VPI.

At the receiving access unit AU1 all layers are traversed up to the user where only the time slot remains. The time slot is sent to the telephone set T4.

The other circuit connection T6-T8 shown in FIG. 4 shares the same VP-PDU between mapper unit MU1 and access unit AU1. It is possible to do so since they share the same virtual path VP.

As shown in FIG. 9 some system entities only bridges data. In order to distinguish a termination point at which the SDU is transferred to or from the adjacent higher layer from a bridging point the terms "trail" and "link" connections (LC) are used. This terms are defined in the CCITT G803 standard.

A trail is set up between two termination points, the source and the sink. A trail consists of one or more link connections.

Identifiers are assigned to the PDU:s traversing a link connection. The identifiers make it possible to associate the PDU:s to their respective trails.

In FIG. 10 there is shown a table containing identifiers which are assigned to cells traversing the node in FIG. 4 for the two connections shown in said Figure. The table shown in FIG. 10 are used by the mapping units MU1-MU4 to translate the PRI, VPI and VCI identifiers indicated in the header of an incoming cell to new PRI, VPI and VCI identifiers which are put in the header of the outgoing cells at a specific mapper unit. The identifier assignment table in FIG. 10 is set up by the control system 500 in accordance with generally known principles. In the example VC-PDU are used for the AU3-MU1 and the AU4-MU1 connections. It is possible to do so thanks to the protocol model since the VC-layer can be omitted and instead the PR- and VP-layers are used. It should be noted, however, that it would have been possible to assign VC-PDUs with associated VCIs.

From the VPI column in the table it is apparent that the same VPI, that is VPI=2, is used for the two link connections T5-T4 and T6-T8. It is possible to do so when passing the SDU to the VP layer since the other connection qualifiers, VPI and PRI, are different. One could equally well have assigned different VPIs for the two connections and refrained from using the physical route identifier PRI. However, by using the physical route identifier PRI as a part of the identification the virtual path identifier VPI and virtual connection identifier VCI can have local administration with the same scope as the physical route. Such local administration means that only parts of the conversion table shown in FIG. 10 need to be used at the mapping units. Accordingly, it is not necessary that each mapping unit comprises the complete mapping table of all connections as set up by the control system 500. This will be explained in more detail with reference to FIGS. 28, 29 and 33.

However, there must always exist one significant identifier or a combination of significant identifier in order to identify the connection or the trail at a higher layer. The significant identifiers are marked in bold in the table in the example shown.

Of course, the example shown in FIGS. 4 and 10 only refers to two connections. It may be difficult to understand the benefits by the invention by just considering these two connections. However, when considering that thousands of connections are busy at the same time it is easy to understand that it will be easy to find a unique combination of identifiers for each link connection.

Figure 11:
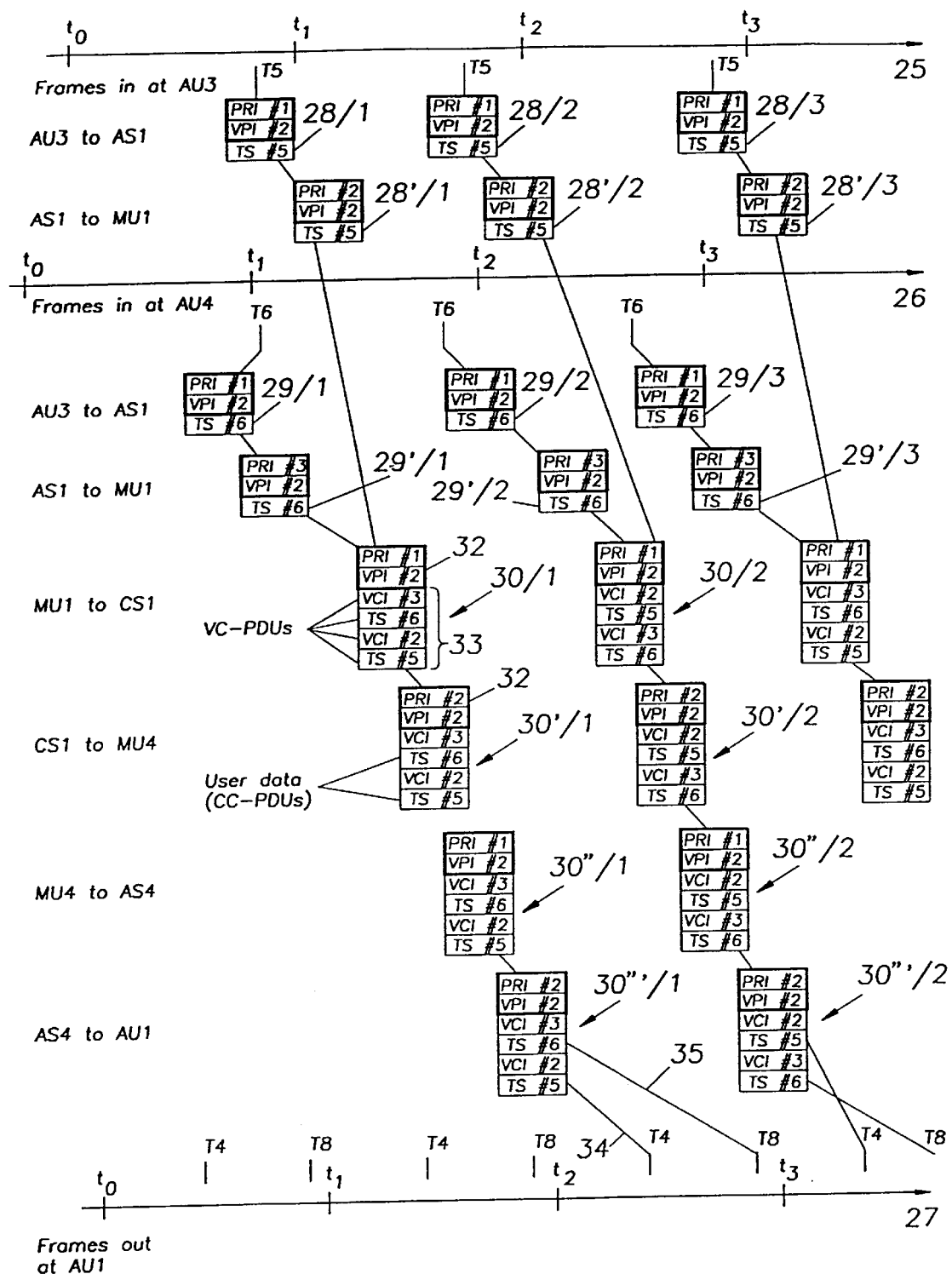
FIG. 11 is a timing diagram showing micro cells in accordance with the invention at the various network entities shown in FIG. 4.

In FIG. 11 the PR-PDU-cells making up the two connections shown in FIG. 4 are shown when traversing the ATM node of FIG. 4 from their originating access units AU3 and AU4 to their common terminating access unit AU1. In FIG. 11 three time axes 25, 26 and 27 are shown. Time axis 25 represents the time at access unit AU3, time axis 26 represents the time at access unit AU4 and time axis 27 represents the time at the terminating access unit AU1. The vertical marks T0, T1, T3 . . . represent times that are separated by 125 $\mu s$ . FIG. 11 is rather complex but tries to give the essence of the STM switching principle. The time slot TS#5 for the CC-trail T5-T4, denoted 24 in FIG. 9, is put in a small PR-PDU-cell at every frame generated at access unit AU3. These small PR-PDU-cells are denoted 28/1, 28/2, 28/3 . . . and are generated during the first, second and third frame respectively. When travelling from AU3 to AS1 PR-PDU-cell 28/1 has the indicated PRI and VPI identifiers PRI#1 and VPI#1. The mapper unit MU1 changes the PRI# from 1 to 2 when the small PR-PDU-cell 28/1 leaves AS1. The VPI remains unchanged. In a similar way the time slot TS#6 is packed into PR-PDU-cells 29/1, 29/2, 29/3 . . . at each frame generated at access unit AU3. The small PR-PDU-cell proceeds from AU3 to AS1 and has during this journey a PRI equal to 1 and a VPI equal to 1. When arriving to access AS1 the PRI is changed from 1 to 3 as indicated at PR-PDU-cell 29'/1, 29'/2 . . .

At mapper unit MU1 a VC-PCU is created for time slot TS#5 and another VC-PCU is created for time slot T#6. The two VC-PDU:s are both put into the user data of a VP-PDU-cell, which in accordance with the example has a VP-trail common to the two VC-links. The VP-PDU-cell with the two VC-PDUS:s in its turn is put in a new large PR-PDU-cell 30/1. A VC-PDU is accordingly created for each time slot. In this particular case VCI#1 is assigned to time slot TS#5 and VCI#2 is assigned to time slot TS#6. This VC-PDU packing procedure is repeated at each frame interval as indicated at PR-PDU-cells 30/2 and 30/3.

From the protocol layers shown at MU1 in FIG. 9 it is apparent that a VC-PDU should be added to the PR- and VP-layers. In FIG. 9 this has been indicated by line segment 31 bridging the VP- and VC- layers. In accordance with the invention the VC-PDU:s are not put into the header 32 of the PR-PDU-cell 30 but in its payload 33. It is possible to do so since a VCI identifies the time slot it is carrying. In PR-PDU-cells 30/1, 30/2 . . . the time slots TS#5 and TS#6 appear in reversed order. This depends on the fact that time slot TS#6 arrived at mapper unit MU1 prior to time slot TS#5. The arrival time of a cell can vary depending on other traffic in the ATM node. Such varying arriving times are characteristic for an asynchronous ATM-switch. By generating the VC-PDUs and by putting the VC-PDUs in a VC-PDU which then is put in a PR-PDU-cell immediately at time at which the respective time slots TS#6 and TS#5 arrive at MU1 the time delay for the two time slots at MU1 is reduced as will be explained later on. To put two or more VC-PDU:s in the VP-PDU user data of one common PR-PDU-cell is in the following referred to as connection of the two or more VC-PDU:s.

From mapper unit MU1 the PR-PDU-cell 30/1 propagates to the far end AU4 with only minor re-mapping. In particular the PR-PDU-cell 30 arrives to the central switch CS1 wherein its PRI is changed from PRI=1 to PRI=2. This has been indicated in bold in FIG. 11 at the PR-PDU-cell 30'/1. The prim sign indicates that the PR-PDU-cell is the same as the PR-PDU-cell 30. The PR-PDU-cell 30' propagates to mapping unit MU4 and at MU4 the PRI is changed from PRI=2 to PRI=1 in order to get a local assignment of the virtual path identifiers. The PR-PDU-cell is now denoted 30"/1 in FIG. 11. The physical route identifier is changed from PRI=1 to PRI=2 when the PR-PDU-cell 30" leaves the access switch AS4 on its route to the terminating access unit AU1. When arriving to AU1 the PR-PDU-cell is denoted 30'41 its PRI is changed from PRI=1 to PRI=2. At access unit AU1 the PR-PDU-cell 30'" is disassembled and the individual time slots TS#6 and TS#5 are put in the frame oriented bit stream generated at access unit AU1. In particular time slot TS#6 is put into the time slot as agreed upon at the set up of the CC-trail. Accordingly time slot T#5 in 30'" is put into the time slot assigned to telephone set T4 and time slot TS#4 is put into the time slot assigned to telephone set T8 as indicated by arrows 34 and 35 respectively. This procedure is repeated cyclically on a frame basis at access unit AU1.

FIG. 11 is somewhat simplified in that the small PR-PDU-cells 28 and 29 are shown to contain only one time slot in the payload. The cell is delivered as soon as its time slot is filled with user data. As explained in connection with FIG. 5 the size of the payload of a cell is determined by the central controller 500 at call setup. Based on traffic analyses at each of the access units the controller 500 may find that several connection should be carried by one and the same cell, like in FIG. 7, and the controller will then select the proper cell type and cell size. How this is done is described in connection with FIG. 19. Anyway FIG. 11 shows that PR-PDU-cells of different cell sizes are used, in particular PR-PDU-cells 28 and 29 have one cell size while PR-PDU-cells 30 has another, larger cell size, in this particular case the sum of the sizes of the VC-PDU:s of cells 29 and 30.

FIG. 11 also illustrates the important aspect of the present invention, namely the use of VC-PDUs as VP-PDU user data in the user data of the VP-PDU-cell. The VC-PDU is generally comprising a virtual circuit identifier VCI and user data. The user data in this particular application comprising one or more time slots in a pre-arranged and pre-determined order.

The VC-PDUs are created inside the ATM node 2 as described in connection with FIG. 9 or can be created at the access nodes depending of the current situation. To create unnecessary VC-PDUs costs extra bandwidth.

The use of VC-PDUs provides a tool for performing asynchronous mapping. Asynchronous mapping is made in order to reduce the propagation delay of a cell. Two mapping methods can be applied, one using asynchronous VC-PDUs and the other not using any VC-PDUs. There is a trade off between the two methods. Mapping without VC-PDUs minimize waste of bandwidth but increases delay while mapping by using VC-PDUs reduces delay but increases bandwidth need.

For booth methods the following common prerequisite apply: At a mapper unit, for example MU1, a number of virtual paths VPs are terminated. An incoming PR-PDU belonging to a virtual path VP holds one time slot. The PR-PDUs, each belonging to an individual virtual path VP, arrive at random—in respect to time—to the mapper unit. All PR-PDU-cells will therefore arrive within a frame interval but the order in which the PR-PDU-cells arrive may vary from frame interval to frame interval.

It should be noted that the frame has no real significance since internally the node is asynchronous. The frame is only used in order to indicate the regularity of the time slots at the periphery of the ATM node and to indicate the regularity by which the PR-PDU-cells are dispatched at an originating access unit.

In the example of FIG. 4 all time slots belonging to different virtual paths are routed to one single outgoing virtual path traversing the same section to the next VP-VC terminating entity AU2. The reason for using this virtual path is to reduce overhead (cell administration related data) while maintaining a low delay. A common PR-PDU-cell header 32 is namely used for many time slots, 2 time slots in the example.

If no VC-PDUs are used: The VP-PDU user data part of the PR-PDUcell will contain just time slots and these must be arranged in a predetermined order. If the order in which the time slots are arranged is reversed, changed or otherwise upset, the origin of each time slot is lost. If the origin is lost then it is not possible to connect an originating user with its proper terminating user. Because the payload only comprises time slots the PR-PDU-cell cannot be dispatched until all time slots making up the cell have arrived. If the PR-PDU-cell, like PR-PDU-cell 30 in FIG. 11, is composed by two or more small PR-PDU-cells, the large PR-PDU-cell 30 cannot be dispatched until the last small PR-PDU-cell, for example PR-PDU-cell 28', containing one or more time slots, has arrived. Since the small PR-PDU-cells arrive randomly, due to the asynchronous nature of the switch and due to the switch behavior, the waiting time for the large PR-PDU-cell 30 is indefinite but will at least be shorter than a frame interval. On the other hand, the payload of the combined large PR-PDU-cell is fully utilized.

If VC-PDUs are used: In this case a virtual connection identifier VCI is attached to the time slots of an incoming VP-PDU and will thus form a VC-PDU. The VCI and the time slot or time slots attached to it is put in the payload of a large PR-PDU-cell or even in the payload of ATM-cell. In the following the VCI and its attached time slot or time slots is now referred to as a VC-PDU and this VC-PDU is now an independent unit that can be put anywhere in the outgoing PR-PDU-cell. The outgoing large PR-PDU-cell can be dispatched as soon at it is filled or as soon as a certain predetermined amount of time has lapsed. After such dispatching has taken place a new PR-PDU-cell belonging to the same virtual path is ready for a new set of VC-PDUs. In this way the PR-PDU-cells will be dispatched as soon as they are filled or will be dispatched at regular time intervals irrespective of the level to which its payload has been filled.

If the PR-PDU-cell is dispatched at regular intervals it is possible to determine the size of the cell at the time it is dispatched. On the other hand if the PR-PDU-cell is dispatched only when it has been filled a predetermined cell size can be used. This method with VC-PDUs in the payload reduces the waiting time and therefore the delay. If the number of incoming time slots is larger or much larger than the number of VC-PDUs in the outgoing PR-PDU-cell it is preferred to use large PR-PDU-cells comprising 56 or 60 octets.

The two methods described above are illustrated in FIGS. 12 and 13. An incoming PR-PDU-cell stream arriving to a mapper unit, for example MU1, is denoted 36 in FIG. 12 and 37 i FIG. 13. In both streams PR-PDU-cells from different virtual paths make up the illustrated bit stream. At the mapper unit the individual PR-PDU-cells should be organized into an outgoing cell that could be a large PR-PDU-cell or an ATM-cell, in other words a PR-PDU-cell of suitable size. This PR-PDU-cell is denoted 38', 38" in FIG. 12 and 39', 39" i FIG. 13. If no VC-PDU:s are used in the payload of the PR-PDU-cells 36 it will be necessary to collect the payloads of cells from virtual paths into the PR-PDU-cell 38' in a predefined order. Such collection takes time. The time slots arrive in a random order to the mapper unit. They must be put in a predetermined order in the waiting outgoing PR-PDU-cell. In other words the time slots must be sorted into their predetermined positions in the waiting PR-PDU-cell. The waiting cell cannot be dispatched until all time slots have been put in their respective positions. In addition, such collection time varies from one waiting cell to the next. Therefore the outgoing PR-PDU-cells are dispatched irregularly. This is referred to as jitter. When the PR-PDU-cell 38' has been filled it is delivered and the procedure is repeated, i.e. the payload (=time slots) in cells from virtual paths are collected in one and the same PR-PDU-cell which, when filled, is dispatched. Accordingly, each PR-PDU-cell 38', 38" . . . is dispatched with an undefined delay, illustrated by the two double headed arrows 40 and 41 respectively. The waiting time for a PR-PDU-cell 38 at the mapper unit is in principle independent of the size of the PR-PDU-cell 38.

Figure 13:
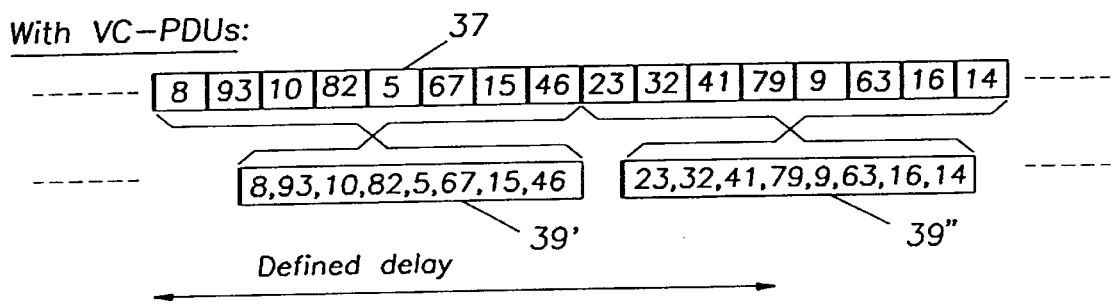
FIG. 13 is a time diagram showing how the jitter of FIG. 12 is reduced in accordance with the invention.

FIG. 13 illustrates the case when the payload of the PR-PDU-cells 37 comprise a VC-PDU. A VC-PDU comprises VCI and CC user data (time slots). In this case the mapper unit does not need to sort the payloads of incoming PR-PDU-cells in a predetermined order in the outgoing PR-PDU-cells. Instead the mapper unit reads the virtual path in the header of each incoming PR-PDU-cell, reads its destination, indicated by the virtual path identifier, and collects the payload of all cells having one and the same virtual path as destination into the larger PR-PDU-cell 39'. When the larger PR-PDU-cell 39' is filled it is dispatched. The mapper unit will in this case immediately map the VC-PDU of an incoming PR-PDU-cell into the waiting PR-PDU-cell 39'. Accordingly the delay is considerably reduced. The delay or waiting time will in this case depend on the size of the PR-PDU-cell. The smaller the size of a PR-PDU-cell is the shorter is the delay.

Figure 14A:
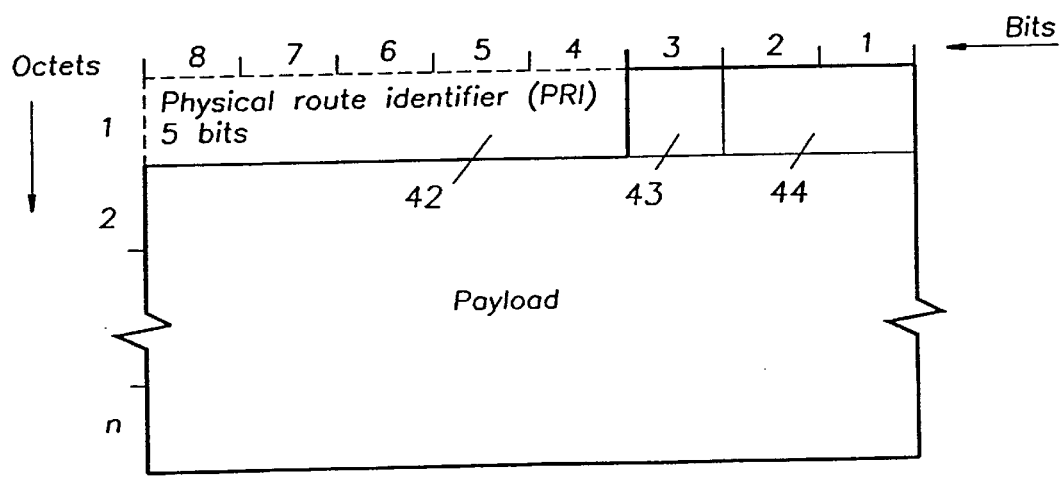
FIG. 14A illustrates the general structure of a PR-PDU micro cell at the physical route layer (PR-layer)

FIG. 14A illustrates the PR-PDU in the header of a PR-PDU-cell in accordance with the invention. The PR-PDU is divided into a PR-PCI part and a PR user data part PR-SDU. The PR-PCI part contains the following fields: A first field 42 comprising the physical route identifier PRI, a second field 43 comprising a cell format indicator CFI and a third field 44, comprising a priority bit. The PRI-field 42 comprises 5 bits.

The cell format indicator, CFI, 43 can take the values of 0 and 1. Format indicator 0 indicates a payload comprising 3 octets (time slots). Format indicator 1 indicates that the next following octet (octet 2 in FIG. 14A) belongs to the cell header and that it comprises the four fields M, CTF, FREE and SBP shown in FIG. 14B.

Figure 14B:
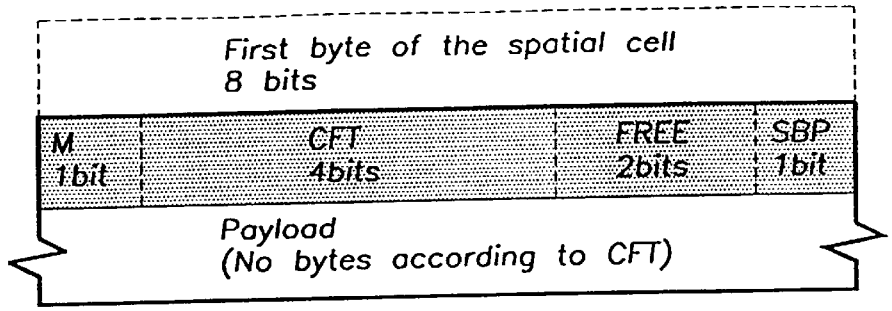
FIG. 14B illustrates a further embodiment of the PR-PDU-cell in FIG. 14A.

In FIG. 14B field M takes one bit which is used for indicating if multicasting of the PR-PDU-cell is completed or not. Field CTF takes 4 bits which are used to indicate the size of the payload of the cell in accordance with the following coding (decimal):

| CTF | TOTAL CELL SIZE | PAYLOAD | |
|-----|-----------------|---------|---|
| 1 | 8 | 6 | |
| 2 | 12 | 10 | |
| 3 | 16 | 14 | |
| 4 | 20 | 18 | |
| 5 | 56 | 53 | ATM-cell is switched |
| 6 | 60 | 53 | ATM-cell is switched |

The SBP bit of FIG. 14B is a parity bit. The bit in the FREE field may be used for different purposes, such as indicating the service class in case an ATM-cell is switched.

Figure 14C:
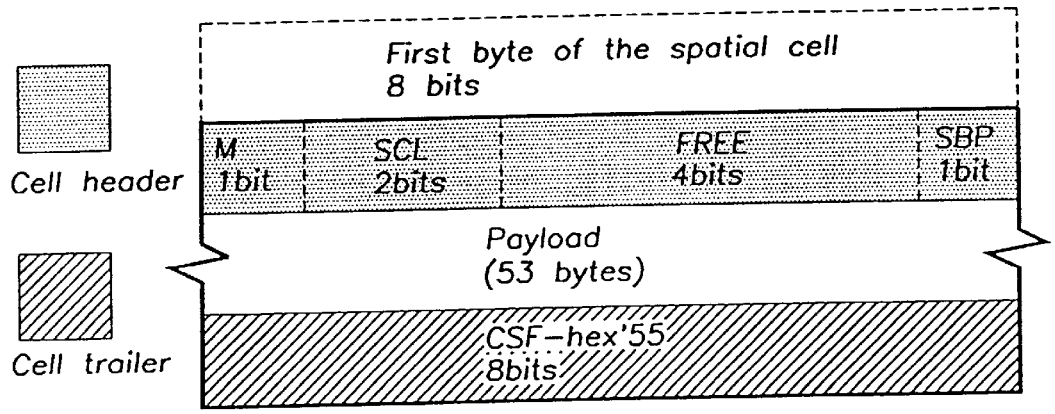
FIG. 14C illustrates a PR-PDU-cell comprising in its payload a standard ATM-cell.

In FIG. 14C the general layout of a PR-PDU cell comprising in its payload a standard ATM-cell which in turn comprises the conventional 53 octets. Since the cell containing the ATM-cell is a large cell it will not be referred to as a micro cell. Instead it will be referred to as a PR-PDU-cell. As explained previously the term PR-PDU-cell also comprises micro cells at the PR-layer.

Figure 15:
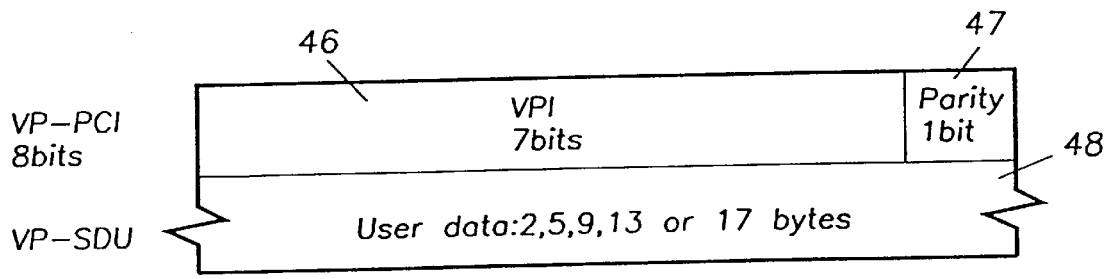
FIG. 15 is showing a VP-PDU-cell at the virtual path layer (VP-layer)

In FIG. 15 the structure of the VP-PDU of a cell at the VP layer in accordance with the invention is illustrated. The VP-PDU is divided into a VP-PCI part and a user data part VP-SDU. The VP-PCI comprises the following fields: A first field 46 containing the virtual path identifier, VPI and a second field 47 comprising a parity bit relating to the VPI field 46. The first field 46 comprises 7 bits. The first and second fields 46, 47 together make up an octet. In the VP-SDU-part, labelled 48, user data comprising 2, 5, 9, 13 or 17 octets are stored. The size is implicit determined by the PR-SDU size. The VP-PDU sizes will therefore be 3, 6, 10, 14 and 18.

The Virtual Path Identifier (VPI) in field 46 ranges from 0–127. The VPI:s are assigned from a low value and in sequential order. The following VPI range map apply:
  0–1 reserved for management
  2–127 valid user numbers
The virtual channel identifier, VCI, in field 49 ranges from 0–127. The VCI:s are assigned from a low value and in sequential order. The following VCI range map apply:
  0–1 reserved for management
  2–126 valid user numbers
  127 indicates dummy VC-PDU, contains no useful payload.

Figure 16:
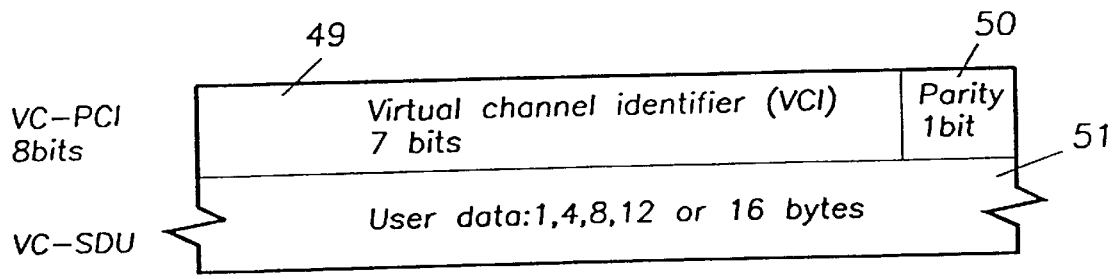
FIG. 16 is showing a VC-PDU-cell at the virtual channel layer (VC-layer)

In FIG. 16 the structure of a VC-PDU-cell is shown. The VC-PDU is divided into a VC-PCI part and a VC-SDU part. The VC-PCI part comprises a first field 49 containing the Virtual Channel Identifier (VCI) and a second field 50 comprising a parity bit relating to the VCI. The first and second fields 49, 50 together make up an octet. In the VC-SDU part, labelled 51, user data comprising 1, 4, 8, 12 or 16 octets are stored. The user data can be of any size as long as it can fit into the PR-PDU-cell. For the defined PR-PDU-cells the following user data sizes are defined: 1, 4, 8, 12 and 16 bytes. The size is implicit by the PRI size in the PR-PDU-cell and in the assigned VP connection.

The entire VC-PDU can be put in the VC-PDU user data or in the ATM-cell payload together with other VC-PDU:s. In the later case the VC-PDU can be of any suitable size.

Figure 17:
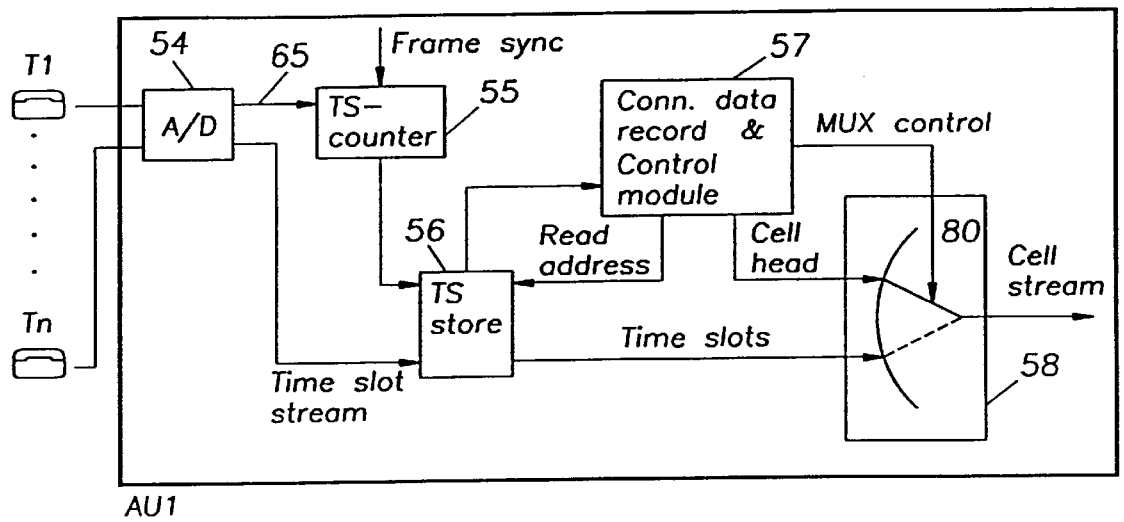
FIG. 17 is a block diagram showing an access unit in accordance with the invention.

FIG. 17 is a block diagram of an access unit shown in FIG. 4, for example access unit AU1. The access unit comprises a A/D converter 54 a time slot counter 55, a time slot store 56, a connection and control module 57 and a cell assembly multiplexor 58. The access unit encapsulates the time slots in a PR-PDU-cell according to the circuit emulation principles described above. Incoming time slots can be stored as VP-PDU user data in the PR-PDU-cell in any combination. A group of time slots or a single time slot can be put in a PR-PDU-cell. The cell size is selected in accordance with the number of time slots which are to be put in the payload of the PR-PDU-cell. This is done by the central control unit 500. The user data can also be mixed up with VC-PDU:s as indicated in FIG. 16.

Figure 7:
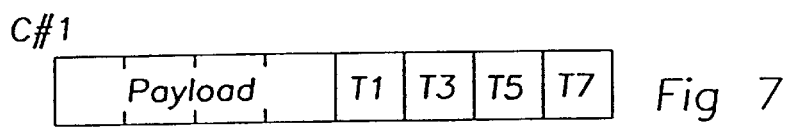
FIG. 7 is showing a micro cell of a second type in accordance with the invention.
Figure 18:
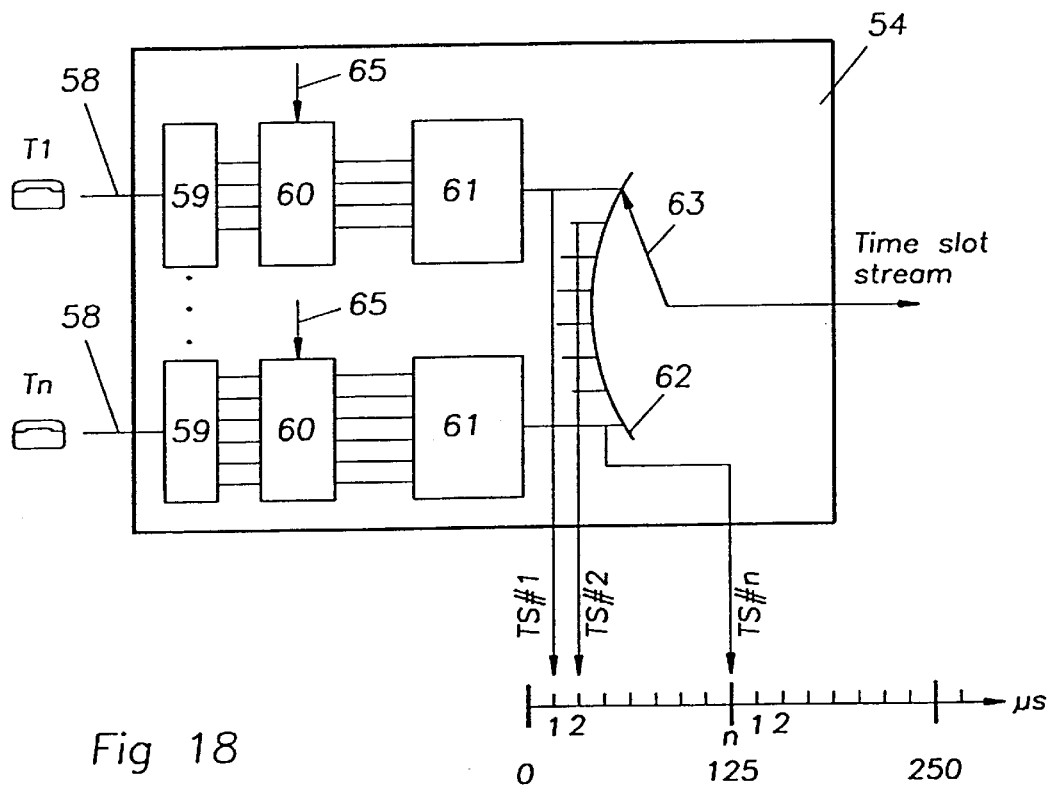
FIG. 18 is a block diagram and a time axis used to illustrate how time slots are generated on a frame oriented basis.

FIG. 18 is a detailed block diagram showing the A/D converter in FIG. 17. Subscriber lines 58, each one connected to a respective subscriber T1-Tn, is connected to a respective analog/digital converter 59 which converts speech into digital form. The A/D converter 59 takes a sample of the speech signal each 125 μs and stores the sample in a register 60. The digitized value of the sample is transferred into a parallel to serial register 61. At each respective parallel to serial register 61 there is present, during each 125 μs interval a sample comprising 8 bits. Each register 61 has an output connected to a multiplexor 62 multiplexing the n audio signals in a strictly timed order onto an output line 63 from the A/D converter 54. The multiplexor 62 may conceptionally be thought of as comprising an rotating arm 64 scanning each of the outputs from the registers 61. Assuming one sample is contained in one octet that comprises 8 bits and assuming one sample is taken each 125 μs the arm 64 is rotating at a rate of 512 Khz giving a time slot stream rate of 64 kbps. The order in which the outputs of the registers 61 is scanned is never changed. The digitized sample of telephone set T1 is put in time slot #1, the sample from telephone set T2 is put in time slot #2, the sample from telephone set T3 is put in time slot #3 etc. up to the last sample from telephone unit Tn which is put in time slot T#n. This procedure is repeated during the next 125 μs interval as shown at the bottom of FIG. 18. Each time slot shown in FIG. 18 thus represents n bits. Arrow 65 in FIG. 18 represents a clock signal keeping track of the time at which each register 60 takes its sample. At telephone set T1 this time occurs at one and the same time within each successive 125 μs interval. At telephone set T1 this occurs at time slot TS#1, at telephone set T2 this occurs at time slot TS#2 etc as shown in FIG. 18. The time slot stream from the A/D converter is stored in a time slot memory 56. Each time slot TS#1, TS#2 . . . TS#n is stored at a position corresponding to its number in the frame. The position in the time slot store is write addressed by the time slot counter 55 which increments one step for each new time slot. The time slot counter starts from zero when a new frame starts. If time slots from more than one frame are to be put in the cell (c.f. FIG. 7) a multi-frame counter is used. The size of the time slot counter and of the time slot store equals the number of time slots in the incoming time slot stream.

The time slot store 56 comprises a number of locations, each one associated with a cell qualifier 66 and an index address 67. This has been indicated in FIG. 19. The connection and control module 57 holds a description of the PR-PDU-cell. The cell description comprises a cell header 68 and a read address 69. The read address indicates the address in the time slot store 56 at which the time slot to be put in the VP-PDU user data should be fetched. If the user data contains VP-PDUs the virtual channel identifier VCI is also found in the connection control module 57. The cell qualifier 66 indicates if the time slot is to be put in the VP-PDU-cell user data part or not. In the case of the example of FIG. 4 the time slots belonging to telephone sets T5 and T6 should be put in the VP-PDU-cell user data part while the time slots belonging to the rest of the shown telephone sets should not qualify for insertion.

The connection control module 57 is addressed by the time slot counter 55 in order to establish a relation between the PR-PDU-cell and the time slot. Connection and control module 57 controls the cell assembly multiplexor 58 that assembles the PR-PDU-cells. This cell assembly multiplexor 58 also comprises means for generating parity 3 and a bit interleaved parity in the VP-PCI. Parity 1 and parity 2 in the PR-PCI are pre-calculated and stored directly in the connection data record.

Figure 19:
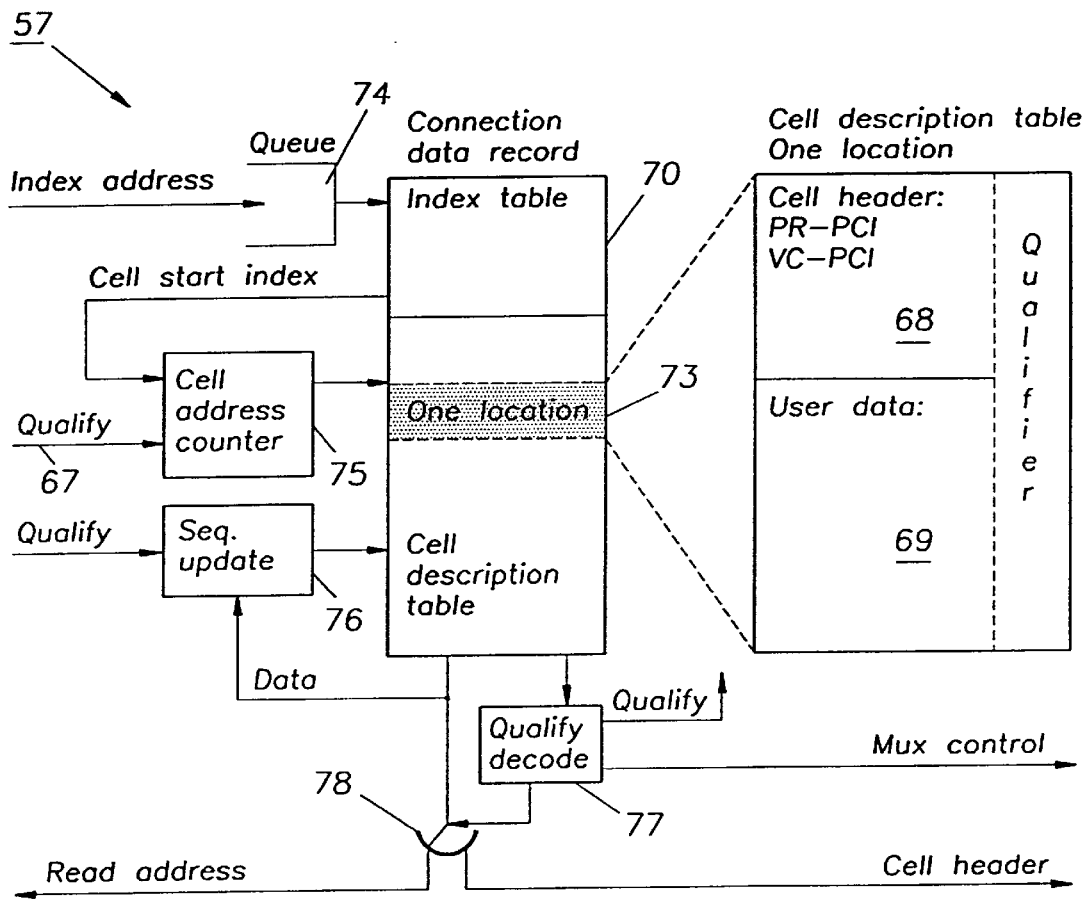
FIG. 19 is a block diagram showing the connection data record and control module of FIG. 17.

In FIG. 19 a block diagram of the connection and control module 57 is shown. A connection data record 70 comprises an index table 71 and a cell description table 72 which in turn comprises a number of locations 73 of which one is shown in FIG. 19. The connection and control module 54 further comprises que means 74 for queuing incoming index addresses, a cell address counter 75 and sequence update means 76. There is also a qualify decoder 77 controlling the operation of a multiplexor 78.

Next the operation of the connection and control module 57 will be described with reference to FIG. 20. The time slots generated by the A/D converter 54 should be assembled into a micro cell. The time slots are stored in the time slot store 56 under control from the time slot counter 55. If the cell qualifier equals 0 this indicates that more time slots are to be stored before the PR-PDU-cell is delivered. If the cell qualifier 66 equals 1 this indicates that the PR-PDU-cell has been filled and is ready for delivery. If the PR-PDU-cell comprises just one time slot then the PR-PDU-cell comprising this time slot should be delivered a soon as a time slot has been stored in the time slot store. If a PR-PDU-cell comprises more than one time slot the cell qualifier 66 is used to indicate when the last time slot of the PR-PDU-cell has been written into the time store 55. The time slot store 56 also comprises an index address table 67 comprising a number of locations, each location corresponding to a respective time slot. The index address location corresponding to the last time slot of the PR-PDU-cell comprises an index address to the index table 71 at which address a pointer to the address of the cell start in the cell description table 72 is stored. In the cell description table 72 pointers to the cell descriptors 73 are stored. The number of cell descriptors equals the number of virtual paths that are supported by the access unit. The cell descriptor 73 has the same size as the size of a PR-PDU-cell. The cell descriptor 73 is an image of the PR-PDU-cell itself with memory locations for the cell header 68 and the VP-PDU user data. However, user data are not contained in the cell descriptor 73. Instead pointers to the time slots making up such user data are stored therein. The pointers point to the addresses in the time slot store where the digitized values making up an individual time slot are stored. In this way the cell descriptor is generic for all PR-PDU-cells sent in successive frames. However, the cell descriptor are different for different PR-PDU-cell sizes. In the shown example cell descriptor 73 comprises a cell header 68 and four pointers of which pointer *TS1 points to the location of TS#1 in time slot 56, pointer *TS2 points to the address of TS#2 in time slot 56 etc. Since four virtual paths are conceivable four such cell descriptors 73 are shown, each such descriptor being related to a respective virtual path. The cell descriptor comprises a control qualifier 79 which indicates if the cell descriptor data relates to the cell header or to the payload. In the former case the control qualifier equals 1, in the latter case the control qualifier equals 0. This information is decoded in the qualifier decoder 77 controlling the multiplexor 78.

Generally the cell assembly process follows the following steps: Samples from successive frames are stored in the time slot store 56 until the last time slot of the PR-PDU-cell is filled. When the last time slot has been filled this is indicated by setting cell qualifier 66 to 1. The corresponding cell descriptor 73 is taken using the index address in the time slot store 56. It is now time to deliver the PR-PDU-cell. The delivery is controlled by the cell assembly multiplexor 58 which is controlled by the control qualifier 79. As long as a control qualifier 79 equals 1 the arm 80 of the multiplexor is in the upper position shown in FIGS. 17 and 20 and the cell header 68 is put into the outgoing cell stream 81. When the control qualifier 79 switches to a 0 contents of the cell descriptor pointers 69 are swapped with contents of the corresponding time slot store locations thus outputting the corresponding time slots into the cell stream 81 immediately after the header. In this manner cells are generated at a frequency which is controlled by the internal clock signal 65. The index table 71 is used to organize the cell descriptors and provides a means for finding the cell to be delivered. As indicated in FIG. 20 n different cells, each one corresponding to a respective virtual path, is conceivable. The index table contains the address to the cell to be delivered. Cell delivery is asynchronous. Suppose a PR-PDU-cell is under its way being delivered and that a number of time slots accordingly should be outputted. While this takes place the first time slot of a following cell is entered into the time slot store. The index address of this cell is now queued in the queue means 74, a memory of the type first in first out. Accordingly the next cell has to wait until the last time slot of the preceding cell has been delivered. Not until the last time slot of the preceding cell has been delivered the arm 80 of the cell assembly multiplexor 58 is returned to its upper position and the cell header of the next cell, pointed to by the index address stored in the queue means is delivered.

The cell address counter 75 starts to count at the start address of a cell header, said start address being indicated in the cell description table 72. The cell address counter then counts each position of the cell descriptor while the cell is being outputted into the cell stream. While performing this counting the cell address counter 75 monitors the cell qualifier 66. When the cell qualifier 66 equals 1 the cell address counter 75 stops counting and reverts to the queue means 74 in order to fetch the index address of the next cell. Accordingly the size of the cell is not stored in the cell counter 75. Further to controlling the cell assembly the control qualifiers 79 in the cell descriptor 73 has the following functions:

1. Cell header octets #1 to cell assembly multiplexor 58. Increment cell address counter 75.
2. Cell header octet #2 to cell assembly multiplexor 58. Write back updated sequence number. Increment cell address counter.
3. Cell header octet #3 to cell assembly multiplexor. Insert generated parity 3. Increment cell address counter 75.
4. Virtual channel and sequence number to cell assembly multiplexor 58. Write back updated sequence number. Increment cell address counter 75.
5. User data. Issue read address to time slot store 56. Increment cell address counter 75.
6. Last user data. Issue read address to time slot store 56. Increment cell address counter 75. Fetch next index address at queue means 74 and read cell start index.
7. End of cell. Indicate that bit interleaved parity shall be put into the cell stream. Load cell counter with previous retrieved cell start index for next cell.

The above listed qualifier functions are sufficient to drive the cell assembly process together with the supporting functions.

The cell header data is put in the cell stream. When entering the VP-PDU user data part the data can be either a pointer to the time slot store or the virtual channel identifier with sequence number. Which of the two possibilities is told by the qualifier. If it is a pointer to the time slot store the selected time slot is retrieved and is put as VP-PDU user data in the PR-PDU-cell. If it is a virtual channel identifier VCI the identifier itself is put as VP-PDU user data. The above is repeated for every byte until the end of VP-PDU user data and is reached.

If no user data is available to put in a cell means must be provided to dispatch an idle cell in order to maintain the cell stream.

From hardware point of view the time slot store 56, the index table 71, the cell description table 72 and the cell descriptors 73 are using the same memory. Said stores may however be physically separated if required for any reason, for example in order to maintain sufficient data rates.

Figure 20:
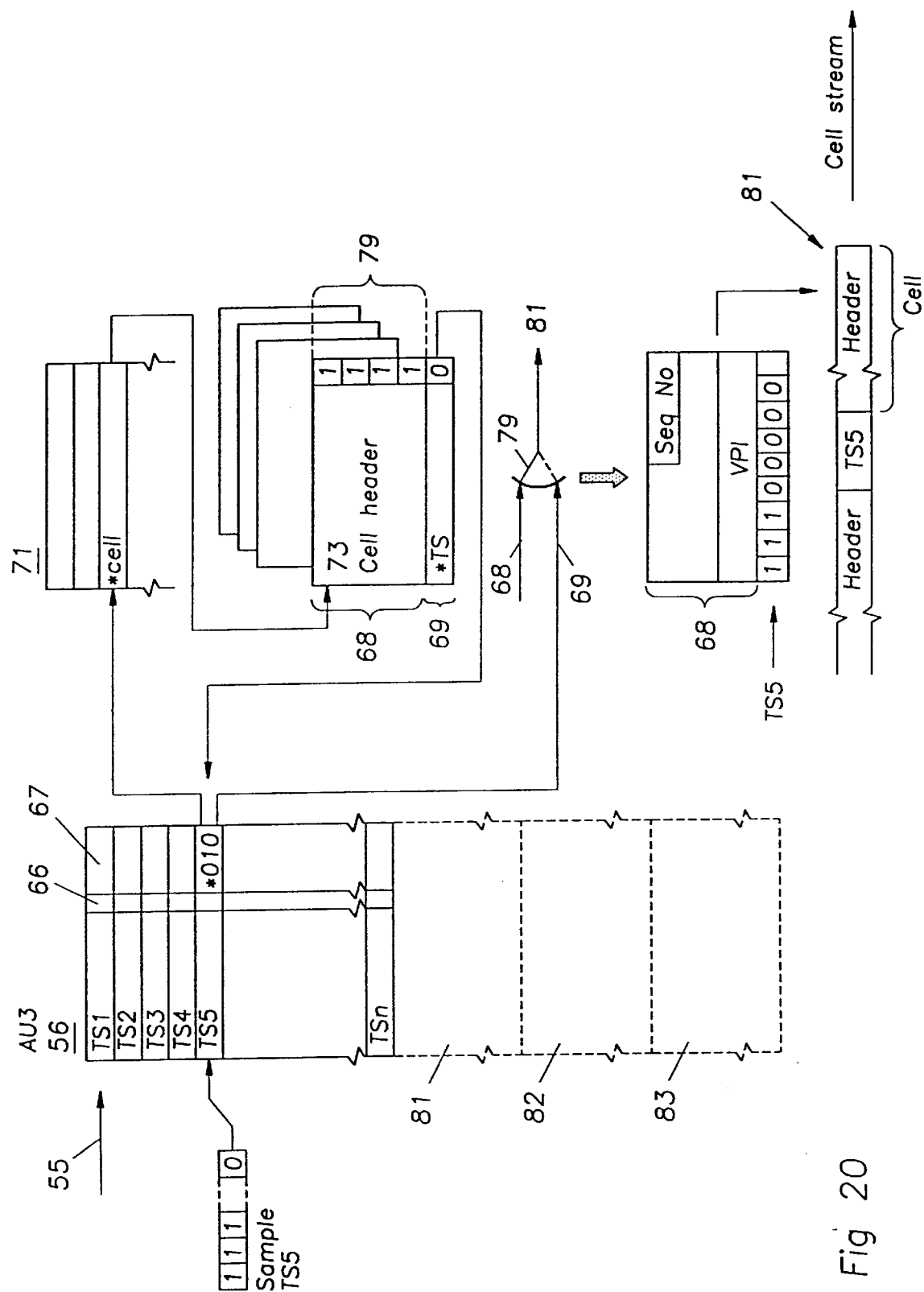
FIG. 20 is a diagram showing the time slot store, the connection data record and control module and the multiplexor of FIG. 19 by which the cell header and the cell payload portion are multiplexed together.

In FIG. 20 the time slot store 56 has as many locations as there are telephone units connected to the access unit AU3. Typically 32 telephone units are connected to an access unit and accordingly the time slot store 56 comprises 32 locations, one for each time slot.

Figure 21:
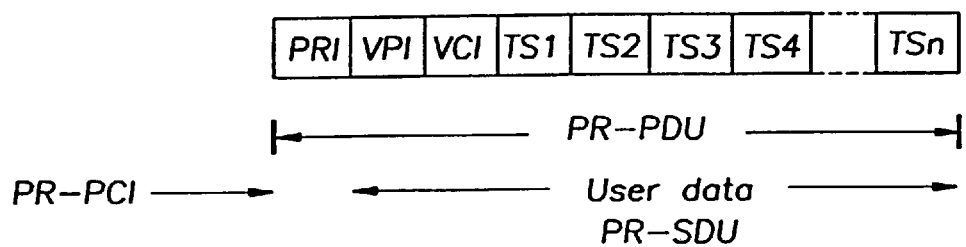
FIG. 21 is showing a micro cell at the PR-layer.

In FIG. 21 the structure of a PR-PDU-cell at the PR-layer is shown. The cell header comprises the PRI-, VPI- and VCI-identifiers and the payload comprises a number of time slots TS1 . . . TSn. In FIG. 21 the PR-PDU, the PR-PCI and the PR-SDU have been indicated.

Figure 22:
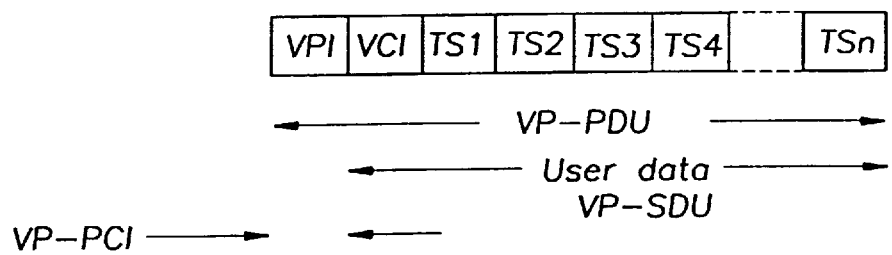
FIG. 22 is showing the micro cell of FIG. 21 at the VP-layer.

When the cell in FIG. 21 is bridged from the PR layer to the VP layer its PR-PCI is removed and the cell will now have the structure shown in FIG. 22. In FIG. 22 the header of the cell comprises the VPI- and VCI-identifiers and the payload is the same as in FIG. 21. In FIG. 22 the definitions of VP-PDU, VP-PCI and VP-SDU are indicated. In FIG. 21 the user data of the cell is the PR-SDU while in FIG. 22 the user data of the cell the VP-SDU.

Figure 23:
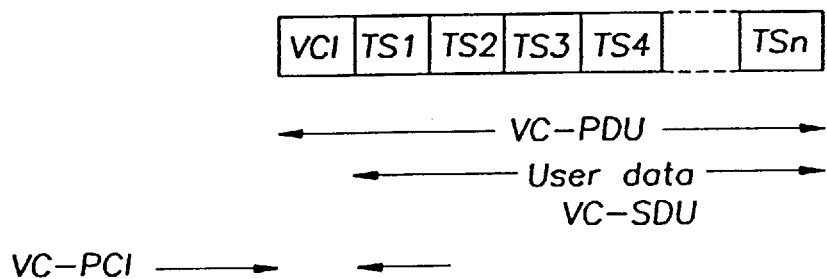
FIG. 23 is showing the micro cell of FIG. 21 at the VC-layer.
Figure 24A:
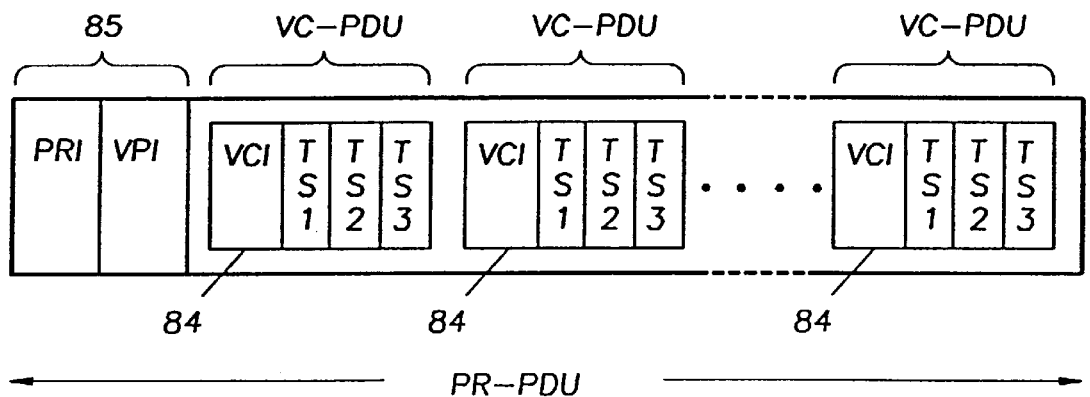
FIG. 24A is showing a number of VC-PDU:s put in a PR-PDU-cell.
Figure 24B:
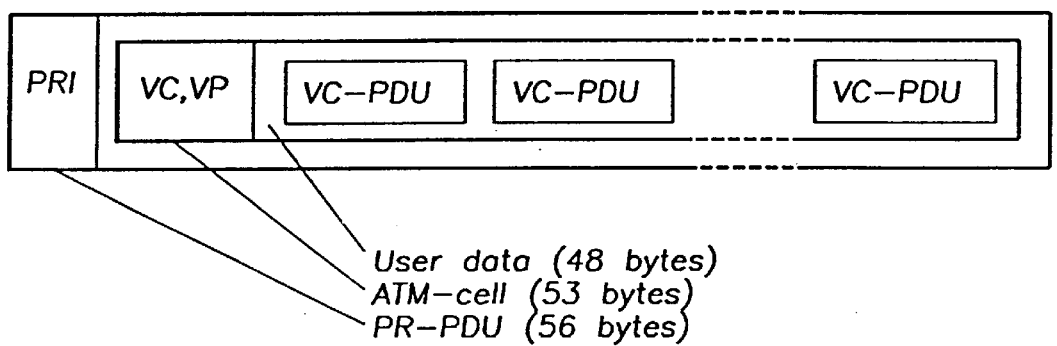
FIG. 24B is showing an ATM-cell in which a number of VC-PDU:s have been put in its user data part, said ATM-cell forming part of an PR-PDU-cell in accordance with the invention.

If the cell shown in FIG. 22 is bridged to the VC-layer its VPI is stripped off and the cell structure will be the one shown in FIG. 23. The definitions of VC-PDU, VC-PCI and VC-SDU are indicated. The VC-SDU part of the cell is the user data of the cell. In FIGS. 21, 23 the time slots TS1-TSn belongs to different connections. They may however, belong to one and same connection as explained in FIG. 6. There may also be a mix up between these two alternatives, i.e. some of the time slots may belong to one connection while the other belong to a second and even third connection. Which is the case is determined by the central control unit 500. In FIG. 24A a PR-PDU-cell comprising a number of VC-PDU:s is shown. A PR-PDU-cell of this type may comprise two or more VC-PDU:s. In FIG. 24 three such VC-PDU:s are shown. Each VC-PDU 84 represents a VC-PDU-cell, i.e. a micro cell of the VC-layer, that has been put in a PR-PDU-cell 85 provided with a PRI- and a VPI identifier which are common to all the VC-PDU-cells. The PR-PDU-cell 85 is still referred to as a micro cell. Each of the VC-PDU-cells 84 in FIG. 24 are bound for the destination indicated by the PRI and VPI values. This destination is the last point along the route which the VC-PDU-cells 84 have in common. In the example given in FIG. 4 this point correspond to access unit AU1 in access switch AS4. The individual VCI values of the VC-PDU-cells 84 may differ from VC-PDU to VC-PDU within the PR-PDU-cell 85. The VCI identifiers shown in FIG. 24A do not belong to the header of the VP-PDU-cell 85 but form part of the user data thereof. This is an important feature of the present invention. By stuffing several VC-PDU:s 84 into one PR-PDU-cell 85 the delay in forwarding cells from their origin to their destination is reduced. This can be clarified by the following metaphor: Suppose the PR-PDU-cell 85 is a train bound for New York (corresponding to the last point where the VC-PDU:s 84 are traveling in common). The individual VC-PDU:s 84 are bound for different cities away from New York. As soon as the VC-PDU:s have filled the PR-PDU-cell 85 the PR-PDU-cell, that is the train to New York, is dispatched. In New York the VC-PDU:s 84 leaves the New York train and takes individual trains to their respective cities. Thus the waiting time at the originating station will be reduced to the time it takes to fill the New York train (the number of VC-PDU-cells 84 making up the New York train) which is short compared to the time it would take to use separate trains 84, (PR-PDU-cells) one for each destination city. Such separate trains would have to be completely filled with passengers (time slots) bound for the particular city until the train would be allowed to leave its originating station.

Figure 25:
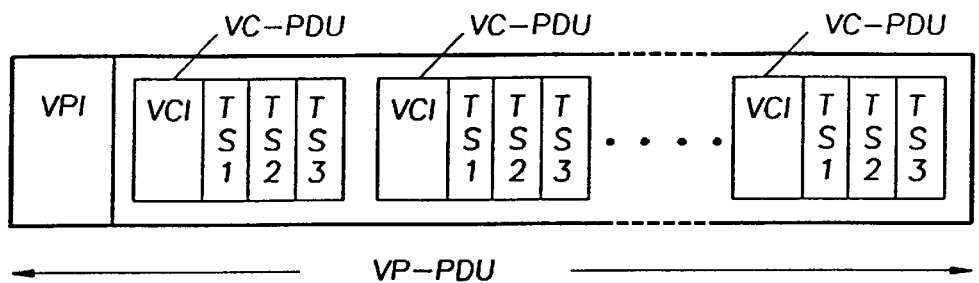
FIG. 25 is showing the larger cell of FIG. 24A at VP-layer.
Figure 26:
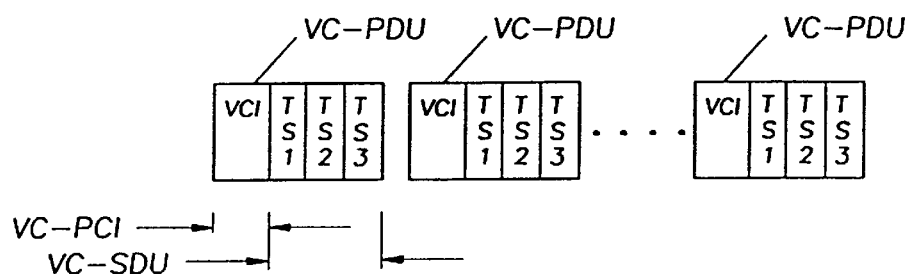
FIG. 26 is showing the cell of FIG. 25 at the VC-layer.

FIG. 25 is disclosing the PR-PDU-cell 85 of FIG. 24A when it is traveling at the VP-layer. In FIG. 26A the individual VC-PDU:s of the PR-PDU-cell 85 are shown in the way they look like when traveling in the VC-layer.

In the exemplary PR-PDU-cell 85 shown in FIG. 24A only three VC-PDU:s are shown although more such VC-PDU:s may be contained therein as has been intimated by the dots.

In FIG. 26A a PR-PDU-cell comprising a standard ATM-cell of 53 bytes size is shown. The PR-PDU-cell is 56 bytes. The user data of the ATM-cell has been filled with a number of VC-PDU-cells.

Figure 27:
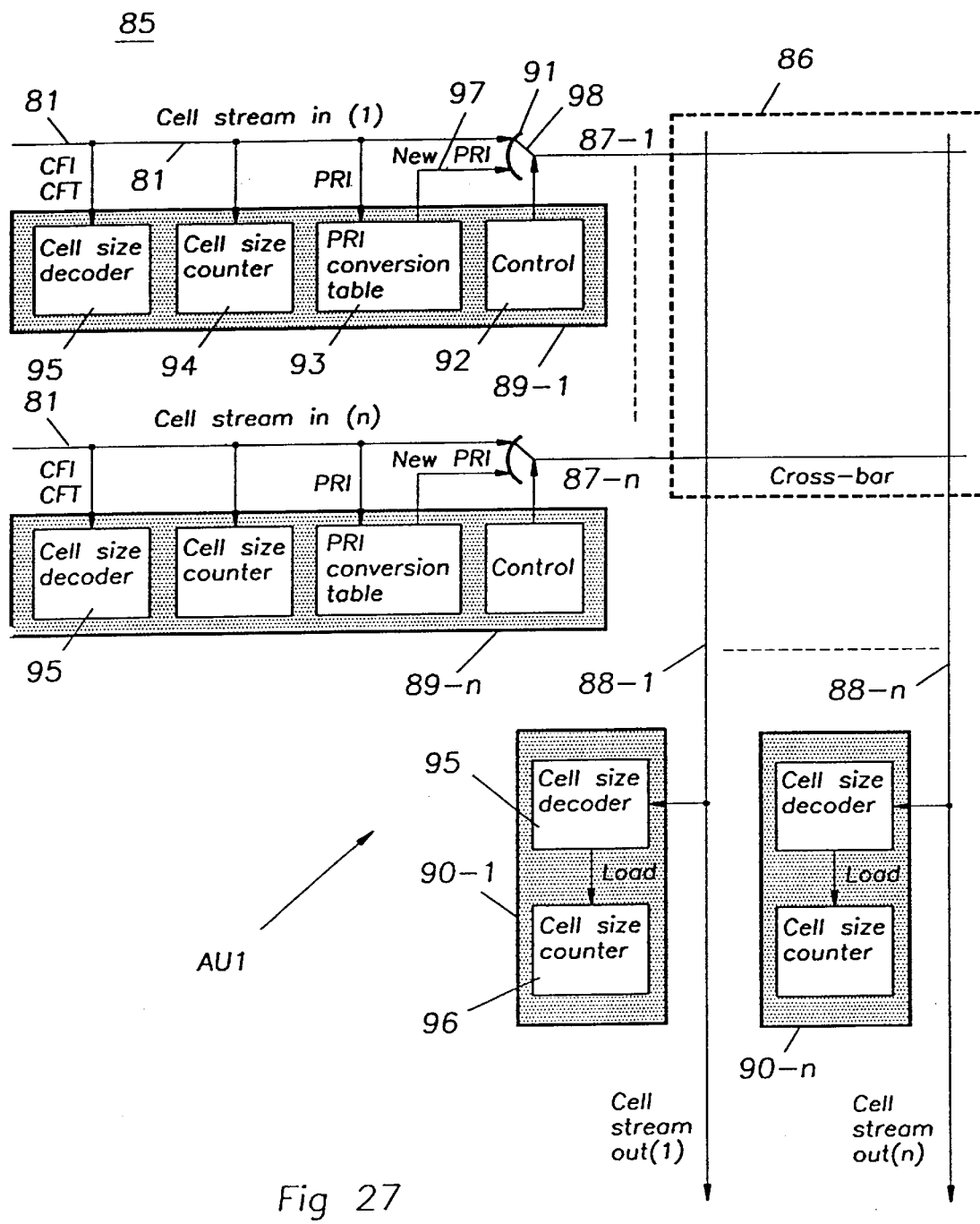
FIG. 27 is a simplified block diagram of the central switch of FIG. 4, in particular the means required to support a spatial switch.

FIG. 27 is a simplified block diagram of a switch provided with means for supporting the specific features of the present invention. The switch shown is any of the switches AS1-AS4 or CS1 in FIG. 4. A conventional cross bar ATM switch 86 has a number of input lines 87-1 . . . 87-n and a number of output lines 88-1 . . . 88-n. In the preferred embodiment of the invention the ATM switch 86 of the type shown in my U.S. patent application Ser. No. 08/011378 filed on Jan. 29, 1993, which is incorporated by reference herein. Each input line 87 is connected to a respective access unit AU. To each input line there is connected a cell size and routing means 89. Cell size and routing means 89-1 is connected to input line 87-1 etc. up to cell size and routing means 89-n which is connected to input line 87-n. By way of example input line 87-1 is connected to AU3 while input line 87-n is connected to AU4. At each of the output lines 88-1 . . . 88-n there is connected a respective cell size decoding means 90-1 . . . 90-m. Since the cell size and routing means 89 are identical only cell size and routing means 89-1 will be described. It comprises a multiplexor 91, control means 92, a PRI-conversion table 93 and cell size counter 94. The multiplexor 91 has two input lines, one being input line 81 for the cell stream and the other denoted 97 from PRI conversion table 93. The multiplexor 98 has an arm 98 movable between the two input lines 81, 97 and is connected to the input line 87-1 of the cross bar switch 86. The main function of the cell size and routing means 89 is to establish which cell size an incoming cell has, to route an incoming cell according to its PRI and to change the PRI value of an incoming cell to a new PRI value indicating the source of the cell. The routing is done in a conventional way using the PRI conversion table 93. From the incoming cell stream 81 the fields containing the size code, i.e. the format indicator and the CTF-field, are decoded, by cell size decoder 95, and loaded into the cell size counter 94. The cell size counter and the control means 92 analyses the incoming cell stream in order to keep track of each incoming cell and as soon as a cell has been identified its PRI value is extracted. The extracted PRI value is used to address the PRI conversion table 93. The PRI value of the incoming cell indicates the destination of the cell or rather the PR trail sink. The value is switched to a new PRI value, taken from the PRI conversion table, indicating the source of the PR trail, in this case telephone unit T5. In this way the termination sink, when analyzing the PRI value will get information on which the sender is. When the cell header is identified arm 98 moves to input lines 97 and the new PRI value, i.e. the PRI value of the originating unit, is inserted into the cell header and thereafter arm 98 moves back to input line 81 and the cell will be passed on onto input line 87-1. Although not described the cross bar switch 86 comprises input buffer and buffers at each cross point of the cross bar as well as output queue buffers.

At each of the output lines there are scanning units, not shown, which scans its respective output line to see if there is a cell, at any of the input lines 87-1 . . . 87-n, which is bound for its output line. If so, the corresponding scanning unit activates a cell extraction unit, now shown but conventional, which then extracts the cell. Since the cell size decoding means 90 are identical only cell size means 90-1 will be described. The main function of each cell size decoding means 90 is to keep track of the various PR-PDU sizes in order to maintain the cell framing. i.e. to know the cell size and to know how many octets that should be transferred through the cross bar switch. The cell size decoding means comprises a cell size decoder 95, similar to that at the inputs, and a cell size counter 96.

Figure 28:
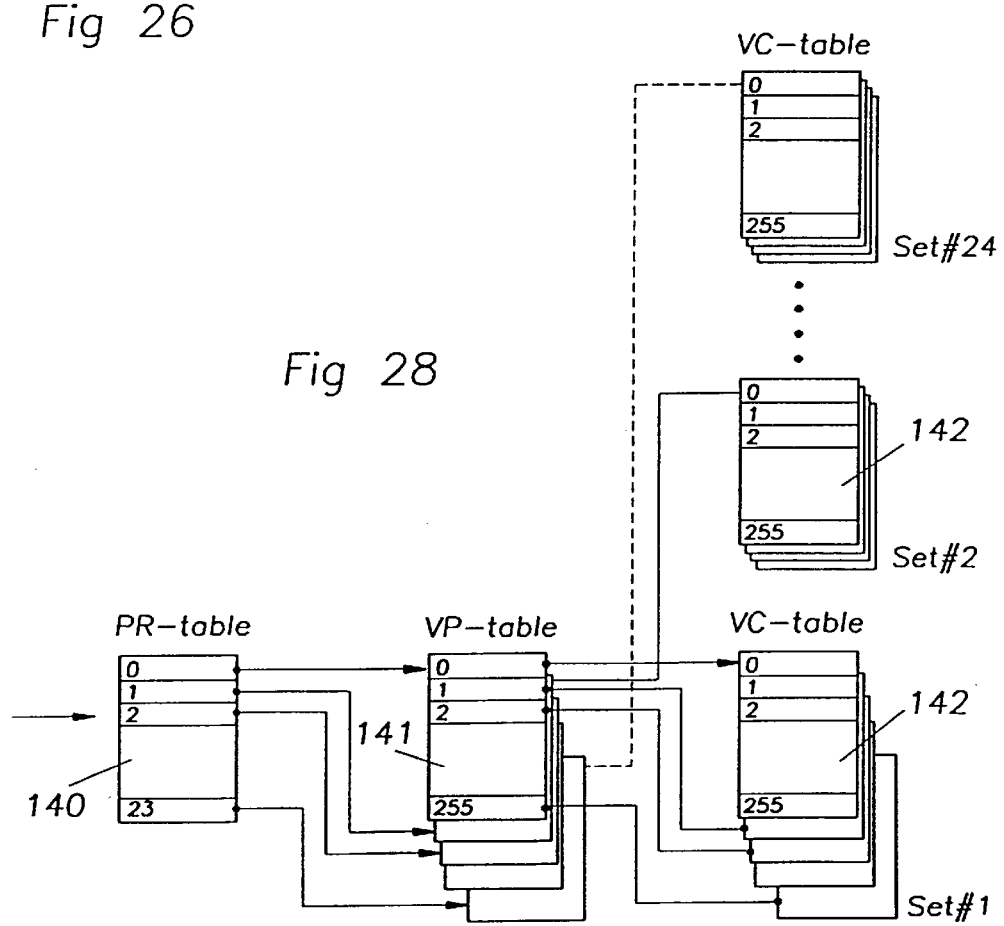
FIG. 28 is a diagram showing the structure of the address space used at each of the network entities of FIG. 4.

In FIG. 28 the address structure used in each of the units of an ATM node 2 is shown. This address structure is accordingly used in the access units, in the access switches A1, in the mapper units M and in the central switch CS. There is a physical route table, PR-table, 140 having a number of entries 0–23. With each entry there is associated a virtual path table 141. Each VPtable has a number of entries 0–255. To each such VP-table entry there is associated a respective virtual connection table VCtable 142. Each VC-table has in turn a number of entries 0–255. Each entry in the PR-table 140 corresponds to a physical route. Since there are 24 entries in the PR table 140 there are 24 VP-tables 141. To each VP-table 141 there is associated 24 sets of VC-tables 142 each such set comprising 256 VC-tables 142. The PRI-identifier, i.e. the pointer in the entry of the PR-table 140 points out the VP-table to be used. The VPI identifier, i.e. the pointer at an entry in a VP table points out which of the 256 VC-tables that should be used. The VCI pointer in turn points out the position in the used VC-table. Accordingly there are 1 . 24 . 256 . 256 addresses that can be addressed, i.e. 24 . 64 k addresses are available. Instead of grouping the addresses in various tables in the manner shown in FIG. 8 it is possible to use a long linear array containing 24 . 64 k addresses. Other address structures are also possible.

Figure 29:
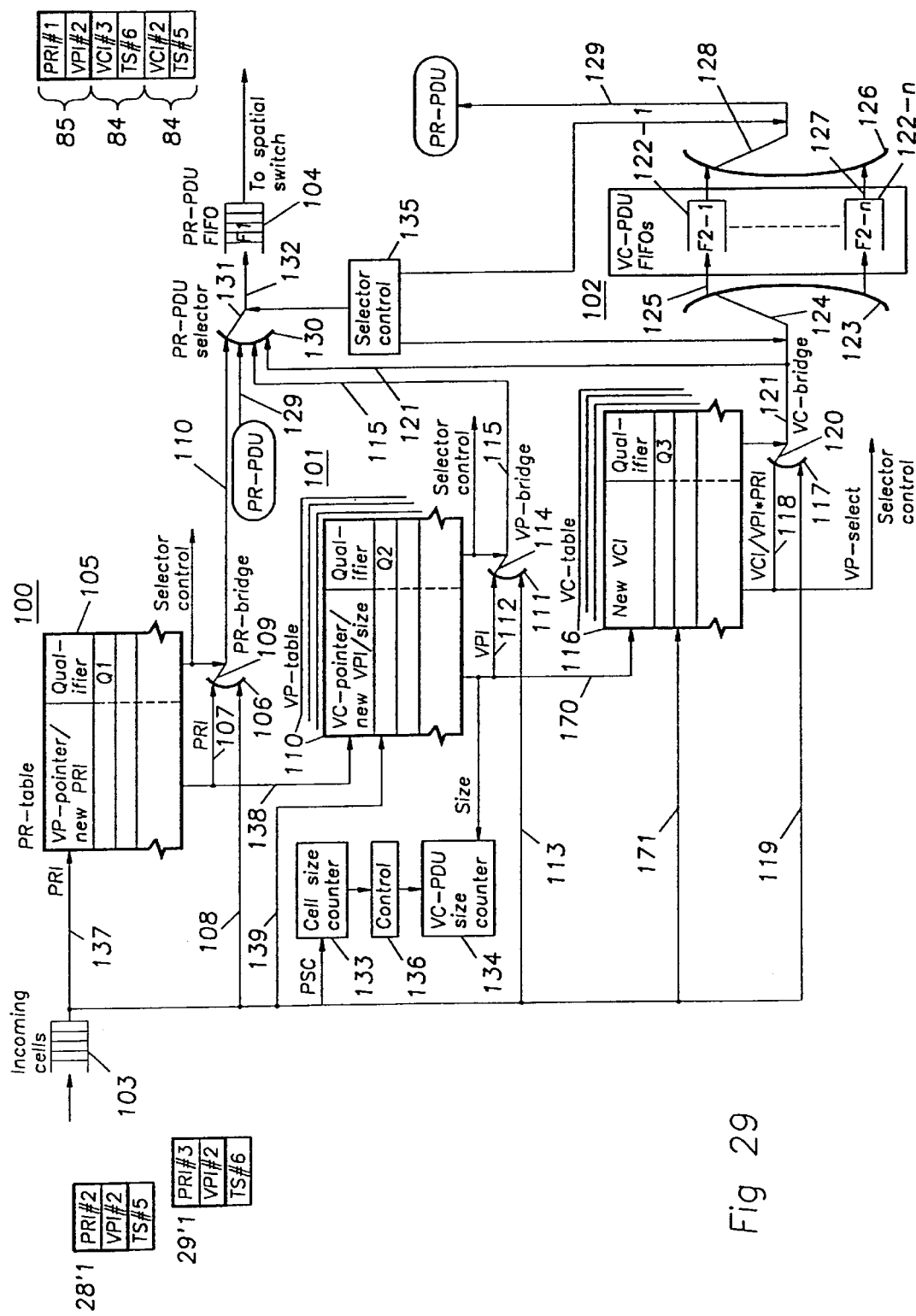
FIG. 29 is a diagram showing mapper unit MU1 of FIG. 4.

Next the mapper units MU1-MU4 will be described with reference to FIG. 29. Since these units are identical only MU1 will be described. Mapper unit MU1 comprises means 100 for handling cells at the PR-level, means 101 for handling cells at the VP level and means 102 for handling cell as the VC-level. The means 102 for handling cells at the VC-level will provide for putting VC-PDU:s in PR-PDUcells as well as for cell disassembly. The mapper unit has also an input fifo 103 and output fifo 104. A fifo is a register of the type first in first out wherein the bits of each octet of the cell are stored in sequential order. Cell handling means 100 comprises a PR table 105 and a multiplexor 106 having two input lines 107, 108, a movable arm 109 and an output line 110. The PR- table 105 comprises a number of entries illustrated by the horizontal lines. Each entry stores either a VP-pointer or a new PRI-value. To each entry a qualifier Q1 is associated. The qualifier Q1 is used to identify the significance of the value stored at its associated entry. If for example Q1=1 the value stored at the entry is a new PRI value. If Q1=0 value stored at the associated entry is a VP-pointer which points to the VP-table to be used for the particular entry.

Cell handling means 101 comprises a number of VP-tables 110, a multiplexor 111 having an input line 112, an input line 113, a movable arm 114 and an output line 115. Each VP-table 110 comprises a number of entries. At each entry there is stored either a VC-pointer or a new VPI or the size of the cell. To each entry there is associated a qualifier Q2. Q2 indicates whether the information stored at its associated entry is a VC-pointer, a new VPI value or a cell size. If for example Q2=0 then the values stored at the corresponding entry are new PRI- and new VPI-values. If Q2=1 then its associated entry stores a VC-pointer, i.e. a pointer to the VC-table associated with the particular VP-table entry. Cell handling means 102 comprises a number of VC-tables 116, a multiplexor 117 having two input lines 118, 119, a movable arm 120 and an output line 121. Each VC-table comprises a number of entries. To each entry there is associated a qualifier Q3. The information stored at a particular entry in the VC-table is either new VPI-. PRI- and VCI-values or an instruction to put two or more VC-PDU-cells into a PR-PDU-cell or an instruction to terminate the circuit at the mapper unit. The significance of the information stored at the entry is determined by Q3. If for example Q3=00 then new VPI-, PRI- and VCI-values are present if, Q3=01 then the information stored at the entry is an instruction to put a number of VC-PDU-cells into a PR-PDU-cell and if Q3=11 then the information stored at the entry is an instruction to terminate the circuit at the mapper unit. Cell handling means 102 also comprises a number of VCU-PDU fifos 121-1 . . . 122-n, where n represents the maximum number of VC-PDU:s that can be put in a PR-PDU-cell. A multiplexor 123 has a movable arm 124 which is connected to the output lines 121. The multiple x or 123 has a number of output lines, schematically shown at 125. Each output line 125 is connected to a respective VC-PDU fifo 122. Cell handling means 102 also comprises a multiplexor 126 having a number of input lines 127, a movable arm 128 and an output line 129. Each input line 127 is associated with a respective VC-PDU fifo 122.

The mapper unit also comprises a main multiplexor 130 with four inputs, a movable arm 131 and an output line 132. The inputs are connected to the output lines 110, 129, 115 and 121 respectively and the output line 132 is connected to the output fifo 104. The mapper unit also comprises a cell size counter 133, a VC-PDU size counter 134 which together operate in order to distinguish the cell header from the cell payload and to distinguish various VC-PDU:s of a PR-PDU-cell from the PR-PDU-cell header.

Figure 30:
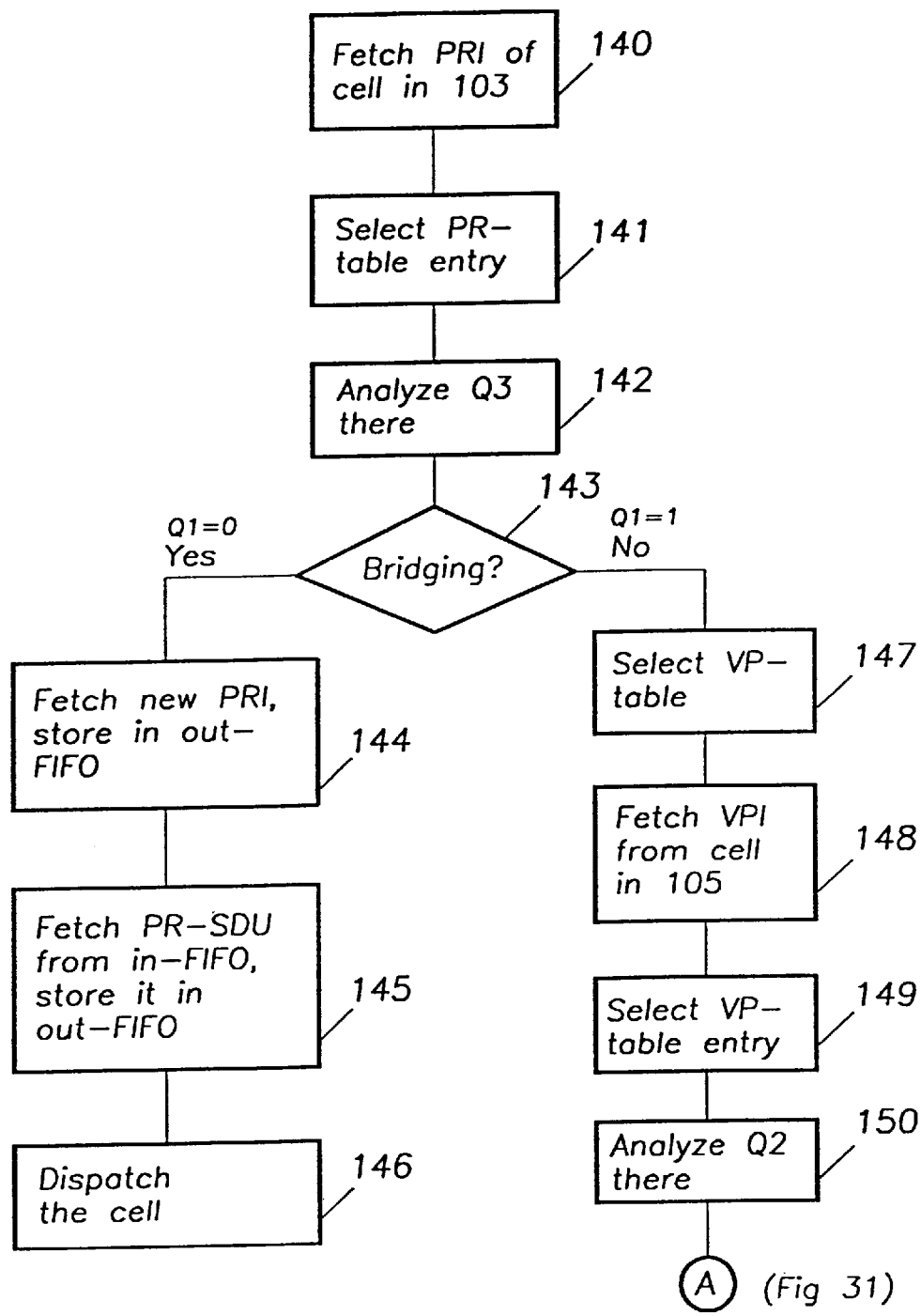
FIGS. 30–32 is a flow diagram showing the operation of the mapper unit of FIG. 29.
Figure 31:
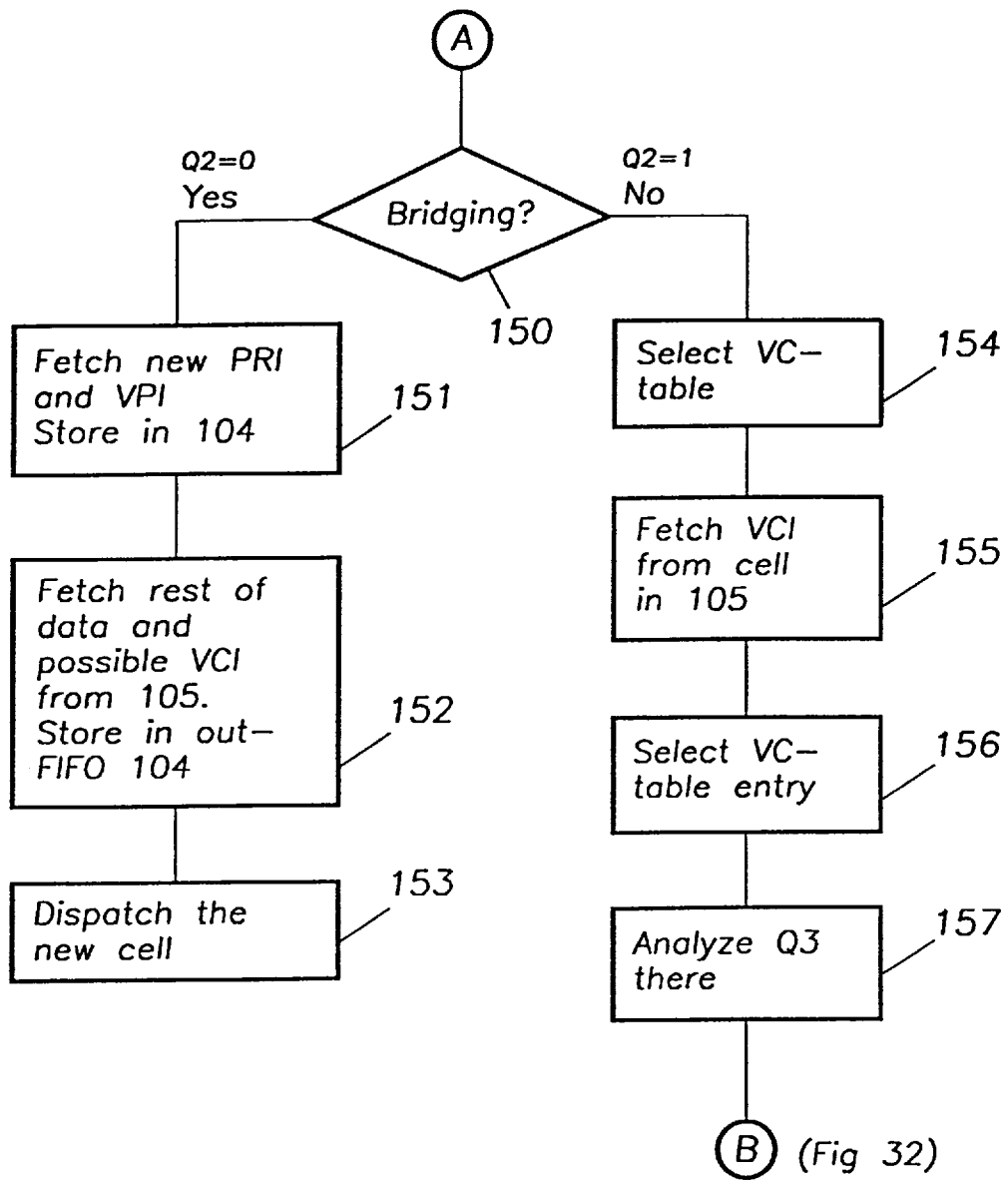
Figure 32:
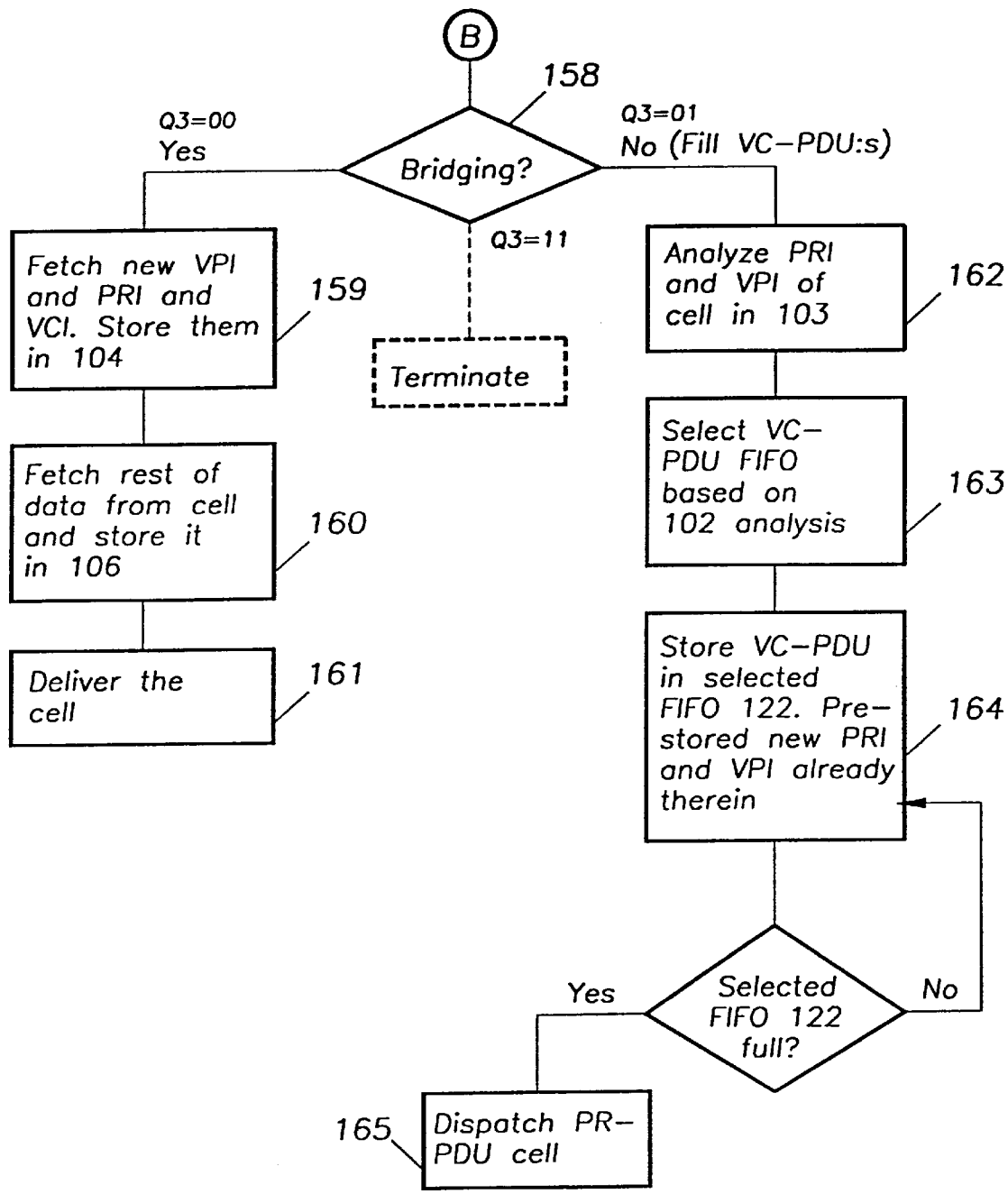

The operation of the mapper unit will next be described in connection with the flow charts shown in FIGS. 30, 31 and 32. Cells arrive at random at the input buffer 103 wherein they are temporarily stored. The PRI-value of the cell in the input buffer 103 is analyzed, block 140. Next the entry corresponding to this PRI-value is entered in the PR-table 105, block 141. In FIG. 129 this is indicated by arrow 137. Next the qualifier at the cited entry is analyzed, block 142. If Q1=0 then the cell should be bridged by the mapper unit, i.e. the old PRI-value should be removed and should be replaced with a new PRI value. If Q=1 then no bridging should be made at the PR-layer and the cell should be further processed. If Q1=0, alternative "yes" at the decision block 143, then arm 109 of multiplexor 106 moves to the indicated position and the new PRI-value is fetched from the entry and is transferred over output line 110 to the output fifo 104 via the main multiplexor 130 which has been brought into the indicated position by the selector control 135. This procedure is indicated in block 144. Next the PR-SDU of the cell in the input fifo 103 should be transferred from the input fifo via input line 108 and output lines 110, 132 to the output fifo 104 wherein it is added to the new PRI value stored therein. Compare box 145. The cell in the output fifo 104 is now dispatched, box 146, and input fifo 103 is empty. As soon as a new cell arrived to the mapper unit it will be stored in input fifo 103.

If qualifier Q1=1, then the value stored at the corresponding entry represents a pointer, in particular a VP-pointer pointing out the particular VP-table, amongst the VP-tables 110, that should be used. This is indicated by arrow 138 and is represented by block 147 in FIG. 30. Next the VPI is fetched from the cell in the input fifo 103. This is indicated by arrow 139 in FIG. 29 and is represented by block 148 in FIG. 30. This VCI indicates the entry to be used in the selected VC-table, block 149. Next, the qualifier Q2 has be investigated in order to find out the significance of the information stored at the entry specified by the VCI. Shall the cell in the input fifo be bridged at the VP-layer or shall it be further processed at higher layers of the protocol? This decision is taken at the decision block 150 in FIG. 31. Similar procedures as described above will now take place. If qualifier Q2=0 then bridging should take place, that is the cell should be transferred from the input fifo 103 to the out fifo 105, its old PRI and VPI values should be removed and be replaced by new PRI- and VPI-values stored at the entry pointed out by arrow 139. This is done by multiplexor 111. Its arm 114 takes the position shown in FIG. 29, the new VPI value is fetched from entry and is transferred via output lines 115. Main multiplexor 130 is set to the input at which output line 115 is connected and the new VPI-value is stored in the output fifo 104. This is represented in block 151. Next the arm 114 is set to the input line 113 and the rest of the data, any VCI:s included, stored in the input fifo 103 is transferred to the output fifo 104. This is represented in block 152. Arm 114 then return to the position shown in FIG. 29. As described above the movements of the arms 114 and 131 are controlled by the selector control 135. At the entry pointed out by arrow 139 there is also information available relating to the size of the cell to be outputted. The size of the cell at the input fifo 103 is fetched by the cell size counter which reads the PSC field of the cell at the input fifo. When the size fetched by the cell size counter 133 equals the size value stored at the entry at the VP table no more octets should be read from the input fifo 103 since the cell at the output fifo is now complete. The selector control 135 is using this fact in order to control the movement of the arm 114. Since the cell at the output fifo now is complete it will be dispatched, block 153.

If the analysis of the Q2 at the entry pointed out by arrow 139 in the selected VP table reveals that Q2=1, the value stored at this entry signifies a pointer, in particular a VC-pointer pointing out the VC table, amongst the VC tables 116, to be used for the particular cell in the input fifo 103. This is represented by arrow 160 in FIG. 29 and by block 154 in FIG. 31. Next the VCI of the cell in the input fifo should be fetched. This is represented by block 155. This VCI-value is also the number of the entry to be used in the selected VC table. This is represented by arrow 161 in FIG. 29 and block 156 in FIG. 31. Once the entry has been selected the qualifier Q3 associated with the entry is examined, block 157.

The Q3 qualifier can start one of three processes according to which the VP-PDU user data contents of the cell in the input fifo 103 should be handled. The processes are either VC-PDU bridging from one VP trail to another, VC-PDU termination or filling VC-PDU into a PR-PDU-cell. VC-PDU bridging takes place if Q3=00. This process corresponds to the VC-PDU dotted line indicated in the protocol stack of FIG. 9. If Q3 indicates that bridging should be made, then the corresponding entry contains new VPI-, PRI- and PCI- values to be attached to the VC-PDU of the cell in the input fifo. The new values are fetched from the entry pointed out by arrow 161 in the selected VC-table and appear at input line 118 to the multiplexor 117 the arm 120 of which has been brought into the shown position by the selector control 135. These new values are transferred from the output line 121 to the corresponding input of the main multiplexor 130 the arm 131 of which has been set to the position corresponding to the input line 171 by the selector control 135. The new VPI-, PRI- and VCI-values are stored in the output fifo 104. This is indicated in block 159 in FIG. 32. Next arm 120 is moved to the position corresponding to line 119 and the rest of the data of the cell in the input fifo 103 is transferred via input line 119, input line 121, arm 131 and output line 132 into output fifo 104. Arm 120 then returns to the position shown in FIG. 29. This is indicated by block 160 in FIG. 32. The PR-PDU-cell in output fifo 104 is now complete and is dispatched, block 161.

If several VC-PDU:s are to be put into the VP-PDU part of a PR-PDU-cell of the type shown in FIG. 25 this will be indicated by the qualifier Q3. No bridging should be made in this case, instead the PRI- and VPI- values of the PR-PDU-cell stored in the input fifo 103 should be analyzed, block 162. Each VC-PDU fifo 122-1 . . . 122-*n* is associated with an outgoing VP-trail. Based on the analysis of the VPI value the corresponding VC-PDU fifo 122 is selected by the selector control 135 which moves arm 124 of multiplexor 123 to the selected VC-PDU fifo. Each VC-PDU fifo has pre-stored therein a new PRI-value and a new VPI-value in order to be able to dispatch a complete cell when it is filled with VC-PDU:s. When the VC-PDU has been stored in its corresponding fifo 122 it resides there and waits for another VC-PDU bound for the same destination as indicated by said new PRI- and VPI-values. The input fifo 103 is empty and is ready for receiving a new incoming cell. This is indicated in block 164. The processes described above in connection with FIG. 30, 31 and 32 are repeated. The status of each of the VC-PDU fifos is supervised and as soon as a fifo is full the PR-PDU-cell is dispatched. This is achieved by moving arm 128 of multiplexor 126 to the input line 127 associated with the filled VC-PDU fifo 122. The PR-PDU-cell is dispatched over output line 129 to the main multiplexor 130 the arm of which has been moved, by the selector control 135, to the corresponding input line 129. The PR-PDU-cell is immediately dispatched without further delay in the output fifo 104. Since the PR-PDU-cell is comparatively long it will take some time to dispatch it completely and during this time the cell handling means 100, 101 and 102 are idle. Meanwhile new cells are stored in the input buffer 103. The VC-PDU fifo supervision means, not shown in the drawing, also supervises the time during which a VC-PDU is stored in each of VC-PDU fifos 122. If this time exceeds a predetermined time, referred to as a time-out limit, the VC-PDU:s stored in a fifo are dispatched. The remaining part of the VP-SDU will be filled with a dummy VC-PDU. A dummy VC-PDU is indicated by setting the VCI-127. Accordingly, the time delay in dispatching the VC-PDU:s is controlled. No VC-PDU:s will be "forgotten", i.e. will not remain undispatched in the mapper unit. Referring to the example given in FIG. 4 and with reference to FIG. 10 PR-PDU-cells 28'/1 and 29'/1 of FIG. 11 are shown in FIG. 29 to the left and the PR-PDU-cell 30-/1 is shown to the right in FIG. 29. PR-PDU-cell 29'/1 is the first one to arrive to the input fifo 103. Its PRI points to entry number 3 of the PR-table and the qualifier Q1 points to a VP-table and the VPI-value of the cell points to entry number 2 in the selected VP-table. Qualifier Q2 at this entry indicates that VC-PDU:s should be put in a PR-PDU-cell and time slot TS#6 and its VCI-value is stored as VC-PDU in the VC-PDU fifo corresponding to the VP trail associated with VPI#2. In this fifo there is pre-stored a PRI-value of 1 and VPI-value of 2. The input fifo 103 is now empty and receives the next cell, cell 29'/1, which is analyzed in a similar way. Its time slot TS#6 together with a VCI value of 2 is stored in the same fifo as the previously described TS#5. The VC-PDU size counter has now counted two VC-PDU:s and the VC-PDU fifo is now ready to dispatch it contents as a new larger PR-PDU-cell comprising in its header PRI#1, VPI#2 and in its payload two VC-PDU:s 84. The VC-PDU filling process that takes place in MU1 is indicated by line 31 in the protocol stack of FIG. 9.

Figure 33:
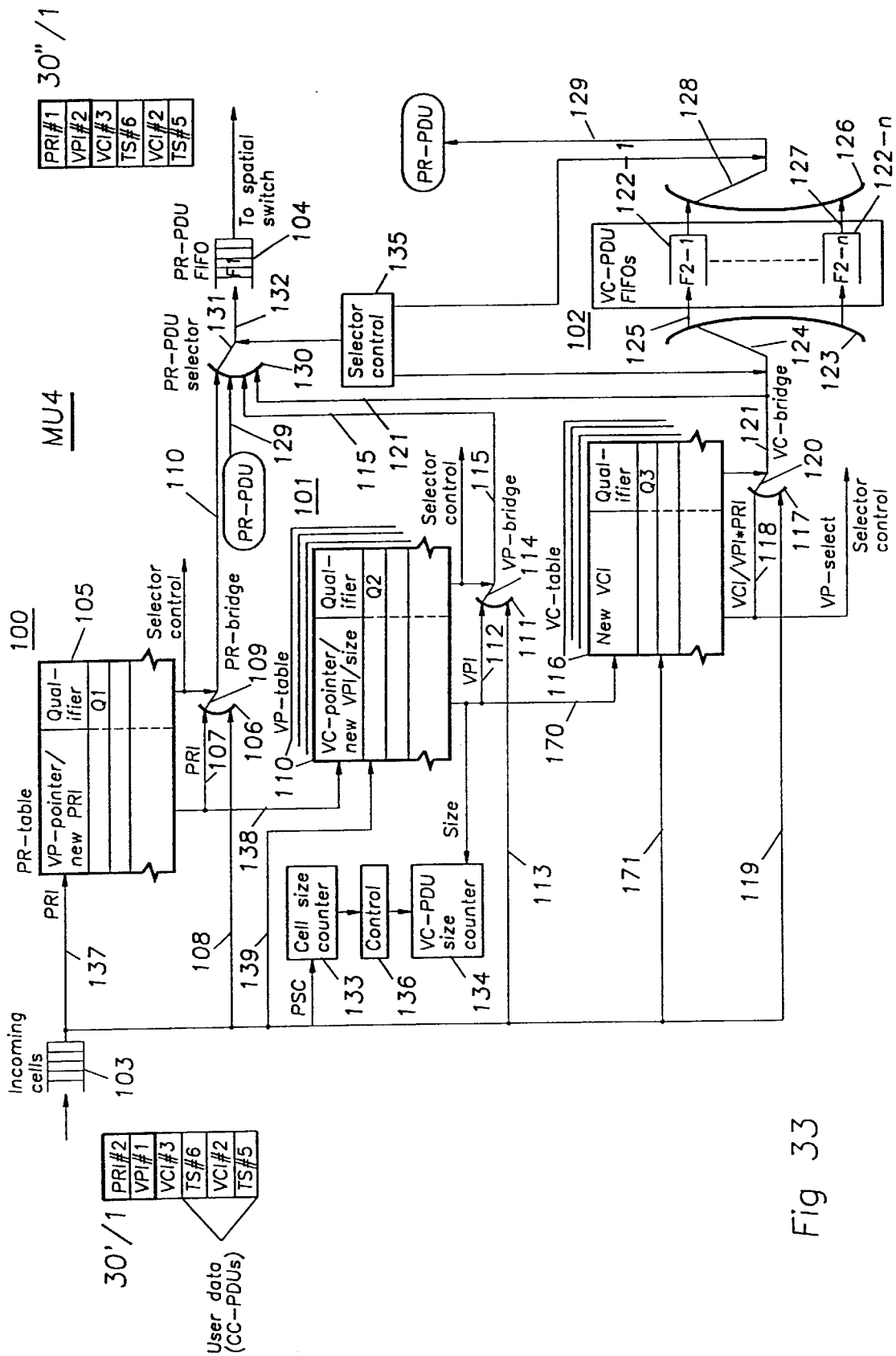
FIG. 33 is a diagram of mapper unit MU4 of FIG. 4.

Having described how the VC-PDU of two cells are put in the VP-PDU of another cell in mapper unit MU1 the way this cell is handled by mapper unit MU4 will next be described in connection with FIG. 33. The concatenated cell 30'/1 is temporarily stored in the input fifo 103. Qualifier Q1 at the second entry of the PR-table 105 indicates that a VP-table should be selected and the qualifier Q2 at the second entry of the selected VP-table indicates that VP-bridging should take place. PRI- and VPI-values are fetched from this entry and are stored in the output fifo 104. The old PRI- and VPI-values are discarded. The rest of the cell in the input fifo 103 is transferred via the multiplexor 115 to the output fifo 106 from which the cell 130'/1 is dispatched. The VC-parts of the cell comprising the VC-PDU:s are never active.

Figure 34:
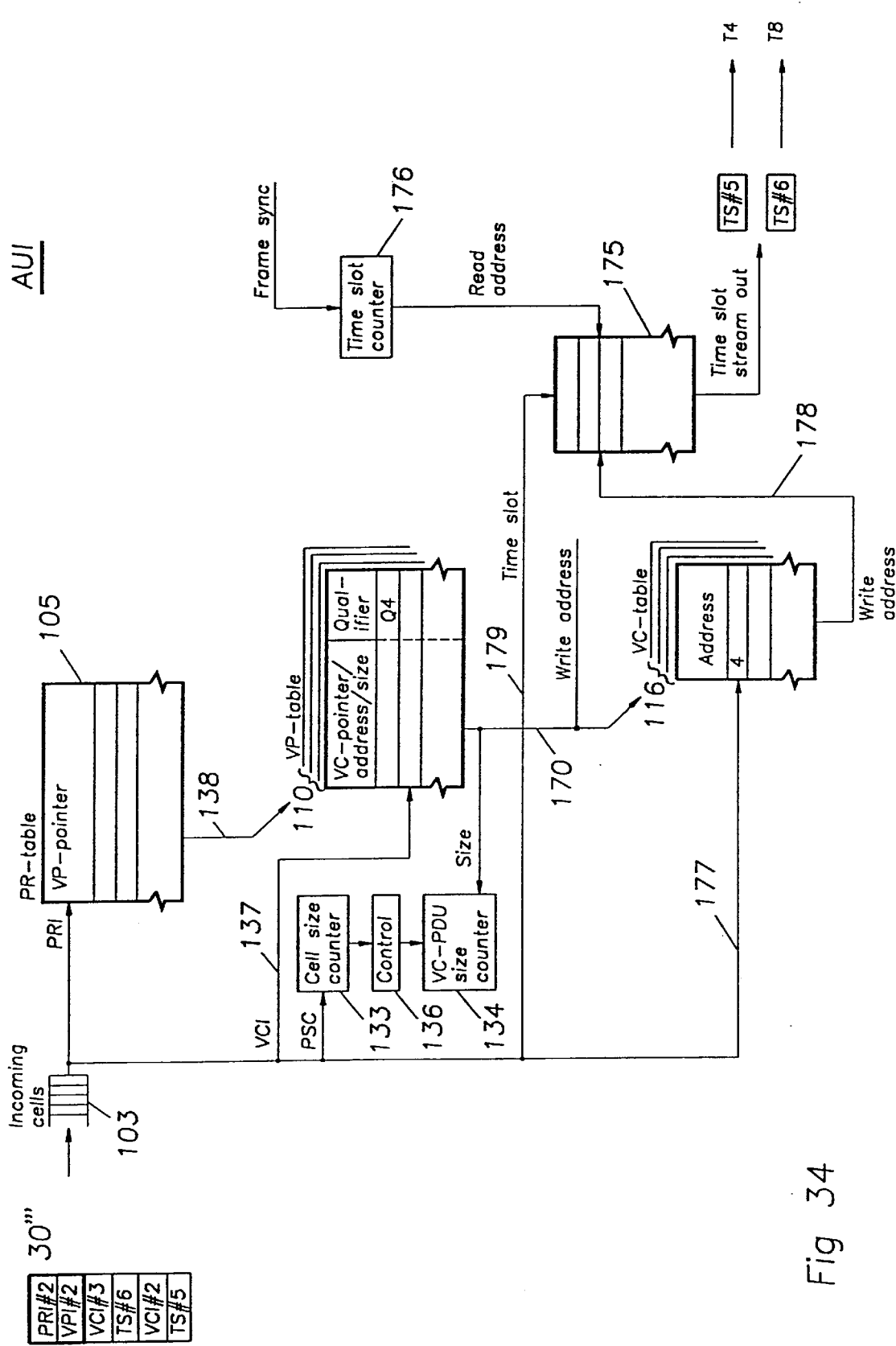
FIG. 34 is a diagram showing the receiving portion of access unit AU1 connected to access switch AS4 is FIG. 4.

In FIG. 34 the receiving portion of an access unit is shown. Since the receiving unit is identical for all access units only that of access unit AU1 connected to AS4 in FIG. 4 will be described in detail. In the receiving access unit cell disassembly takes place. The cell disassembly will be described in general as well as in particular with regard to the PR-PDU-cell 30'''. In FIG. 34 the receiving portion of the access unit comprises a physical route PR-table 105, a number of VP-tables 110, a number of VC-tables 116, a time slot store 175, a time slot counter 176 and a cell size counter 133, a VC-PDU size counter 134 and a control unit 136. Elements which are similar to those described in connection with FIG. 29 have the same reference numerals although physically they are different since they are sitting in different units. In the receiving portion of the access unit the time relationship between the individual time slots which have traversed the ATM node 2 should be restored, i.e. the position of the individual time slots in the frame should be restored. To this end there is a time slot memory 175 and a time slot counter 176. The time slot counter receives a frame sync signal from a local clock, not shown, of the access unit. This clock need not be synchronized with the clock of the STM nodes 3. Each VC-table 116 has a number of entries. This number equals the number of time slots of a frame. The time slot store 175 comprises a number of locations, said number also corresponding to the number of time slots in the frames of the time slot stream leaving the access unit AU1. In this case the outgoing time slot stream is carried by a local line to which the telephone units T1-Tn are connected.

Figure 35:
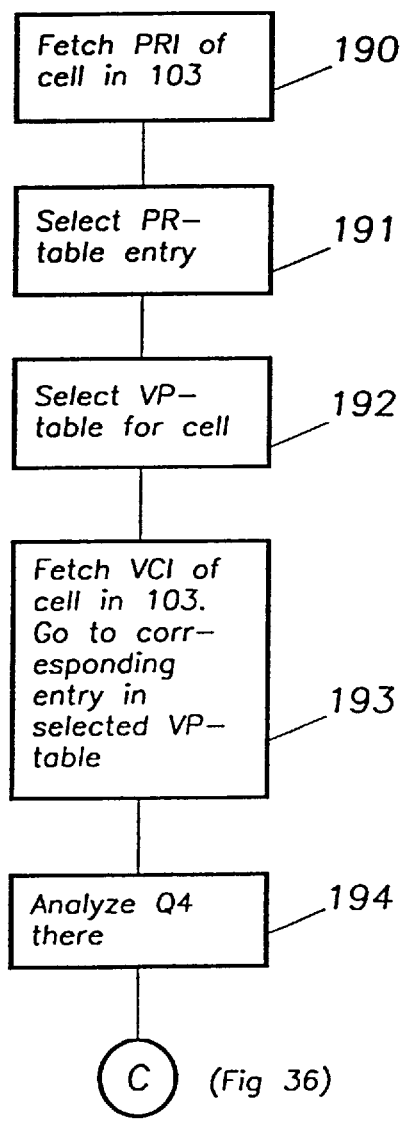
FIGS. 35, 36 is a flow diagram showing the operation of the access unit of FIG. 34.
Figure 36:
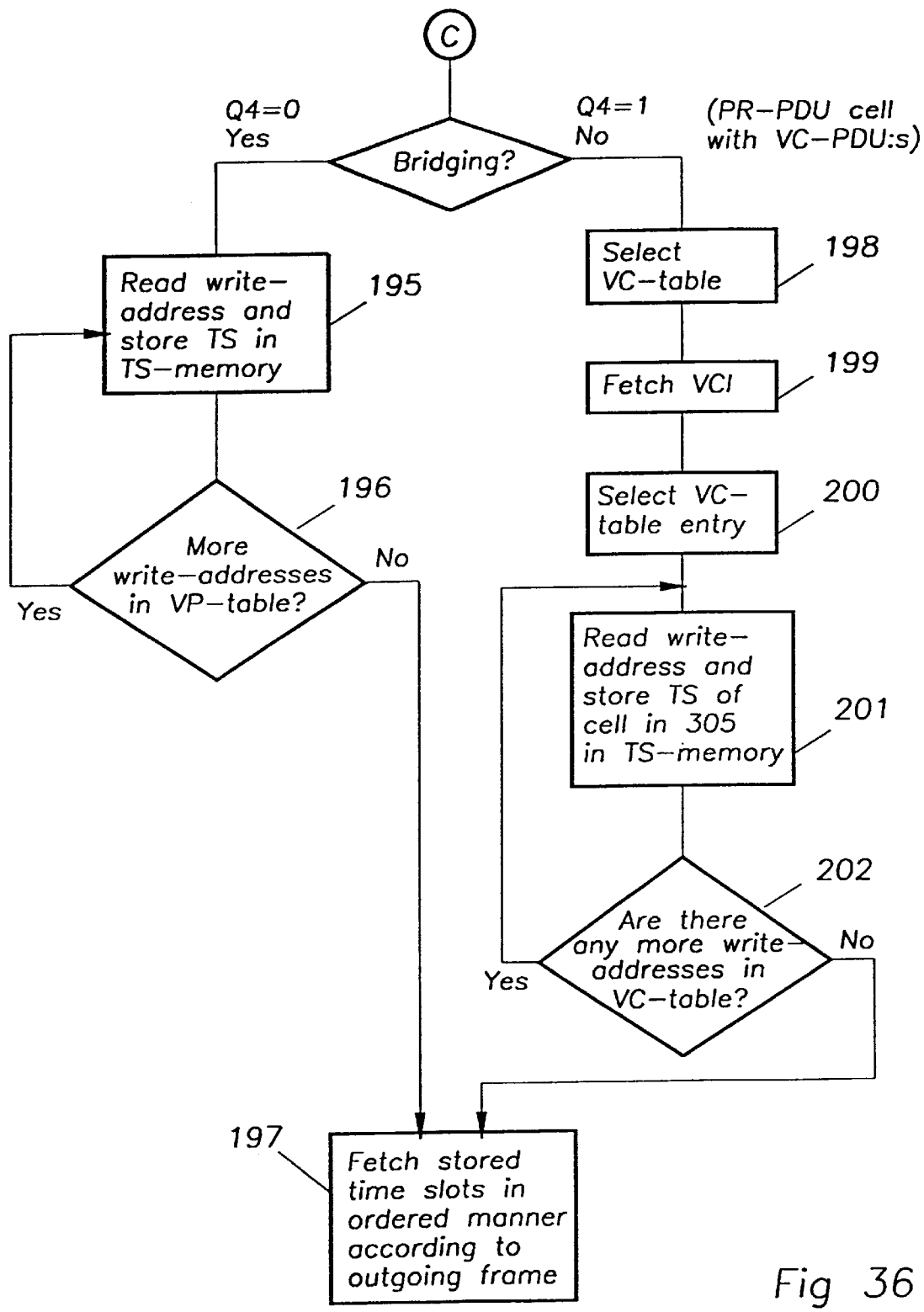

The operation of the receiving portion will be described next with regard to FIGS. 34 and 35. Incoming PR-PDU-cells are stored in the input fifo 103. Next the PRI-value of the PR-PDU-cell in the input fifo is fetched, block 190. The PRI-value indicates the entry in the PR-table 105 that should be used together with this particular cell. This is indicated in block 191. This entry contains a pointer to the VP-table that should be selected amongst the VP-tables 110. This selection is represented by arrow 138 in FIG. 34 and by block 192 in FIG. 35. Next, the VCI-value of the PR-PDU-cell in the input fifo 103 is fetched. The VCI-value indicates the entry to be used in the selected VP-table. This is represented by arrow 137 in FIG. 34 and by block 193 in FIG. 35. As described above each entry is associated with a qualifier. In this particular case the qualifier, labeled Q4, indicates whether the cell is a single micro cell or a cell containing a number of VC-PDU:s. If it is a single micro cell then Q4 indicates that the value stored at the selected entry is a write address indicating at which position the time slot of the incoming PR-PDU-cell should be stored in the time slot store 175. This is indicated at block 195 in FIG. 35. Since the PR-PDU-cell in the input fifo 103 may contain several time slots, i.e. the cell may be of any of the types shown in FIG. 6 and 7, then the VP-table contains several additional write addresses; each such additional address indicating the address at which the associated time slot should be stored in the time slot store 175. Accordingly, an analysis is made whether there are additional write addresses at the entry in the selected VP-table. This analysis is represented by decision block 196. Each such additional address is stored in the time slot store 175. This process is repeated until there are no more time slots left in the input fifo 103. Finally the time slots stored in the time slot store 175 are read by means of the time slot counter 176. The time slot counter starts at 0 for every 125 µs frame of the outgoing STM time slot stream. The counter 176 counts up to the number of time slots contained in the frame and this is done cyclically for every frame. At every count of the time slot counter 176 data contained in the time slot at the corresponding location in the time slot store is fetched. For example, if the frame contains 24 time slots then location 1 in the time slot store corresponds to time slot number 1 in the frame, location 2 corresponds to time slot number 2 in the frame etc. up to location number 24 in the time slot store which corresponds to time slots 24 in the frame. Time slot 1 in the frame may be assigned to telephone unit 1, time slot 2 to telephone unit 2 etc. The read out the time slots stored in the time slot store 175 is indicated in block 197 in FIG. 35.

If qualifier Q4=1 the significance of the value stored at the entry of the selected VP table is a pointer that points to the VC- table 116 to be used with the particular micro cell in the input fifo 103. Accordingly a VC-table is selected. This is indicated by arrow 170 in FIG. 34 and block 198 in FIG. 35. The selected VC-table contains as many write addresses as there are time slots in the PR-PDU-cell in the input fifo 103. Next the VCI-value of the PR-PDU-cell in the input fifo is fetched. This is represented by arrow 177 in FIG. 34 and block 199 in FIG. 35. The fetched VCI-value points out the entry to be used in the selected VC table. This in indicated in block 200. At this entry there is stored a pointer, in particular a pointer to the location in the time slot store 175 at which the time slot of the cell in the input fifo 103 should be stored. Accordingly the pointer in the VC table is a write address that points out the position in the time slot store at which the time slot should be stored. This write address and the position it points to has been indicated with arrow 178 in FIG. 34. The transfer of the time slot of the cell in the input fifo to this write address is indicated by arrow 179 in FIG. 34. In block 201 of FIG. 35 the last two procedures are indicated.

If the cell comprising the VC-PDU:s at the input fifo 103 comprises more than one VC-PDU then the process described in the paragraph above is repeated until all VC-PDU:s have been handled. The time slot counter 176 runs continuously and the time slot memory will be emptied each 125 µsec.

The PR-table in FIG. 34 differs from the PR-table described previously in that there is not any qualifier associated with an entry. This is so because all PR-PDU-cells arriving to the receiving portion of an access unit will be terminated at the access unit.

Applying the above procedure on the cell 30''' shown in the upper left of FIG. 34 a PRI-value of 2 indicates that the second entry of the PR table 105 is associated with the cell 30'''. At this second entry a certain VP-table associated with this cell should be pointed out. Next the VPI-value is fetched and this value is 2 which means that the second entry of the selected VP-table should be addressed. At this second entry the qualifier is analyzed and in this particular case it is found that Q4=1 which means that the cell at the input fifo 103 contains VC-PDU:s Therefore the value stored at the entry of VP-table signifies a particular VC table. This VC-table is selected and the first VCI of the cell is fetched at the input fifo 103. This VCI equals 3 and therefore the third entry of the selected VC-table is addressed. The value stored at this third entry is 4. Accordingly, the location to be selected in the time slot counter is location number 4 at which the time slot TS#6 is stored. The VC-table is analyzed once again and it is found that there is a second VCI in the cell at the input fifo; this second VCI being equal to 2. Accordingly the second entry in the selected VC-table is addressed. At this second entry there is stored the write address "8". Accordingly location number 8 in the time slot store should be addressed and TS#5 is transferred via the line indicated by arrow 179 to the 8th position. This is indicated by arrow 178. No more VCI:s are found in the selected VC-table and accordingly the input fifo is empty. When the time slot counter starts a new frame and steps from location to location in the time slot memory, it will pick up time slot TS#5 at location number 4 and will put this TS#5 into time slot number 4 in the outgoing cell stream. Next, time slot counter arrives to location number 5, finds nothing, steps to location 6, finds nothing etc. and finally at location 8 it will find time slot TS#6 which it will take out and put into time slot number 8 in the outgoing time slot stream. In this way telephone set T4 will have a connection with telephone set T5 in AU3 and telephone unit T8 will have a connection with telephone unit T6 in AU4.

I claim:

1. A method for switching synchronous transfer mode cells in a circuit emulated ATM switch, each one of said cells being delivered to the ATM switch on a frame oriented basis and each one of said cells comprising a header and a payload, said header comprising files, made up by bits, storing details about the cell, said payload carrying user data, wherein said method comprises the step of selecting, in said ATM switch, the size of said cell among a set of cell sizes, wherein the cells are transferred from their origin to their destination using a layered protocol model comprising, in order from the lowest layer to the highest, a physical route layer relating to a physical medium in which said cells are transported, a virtual path layer, a virtual channel layer and a circuit connection layer, the cell at the physical route layer comprising a physical route protocol data unit which in turn is divided into a physical route protocol control information part and a user data part, the cell at the virtual path layer comprising a virtual path protocol data unit which in turn is divided into a virtual path protocol control information part and a user data part, the cell at the virtual channel layer comprising a virtual channel protocol data unit which in turn is divided into a virtual channel protocol control information part and a user data part, the virtual path protocol data unit being the user data part at the physical route layer, the virtual channel protocol data unit being the user data part at the virtual path layer and the cell at the circuit connection layer comprising said time slots, which form the user data part at virtual path layer said cells being transferred along virtual paths formed at each of said physical route, virtual path, and virtual channel layers.

2. A method in accordance with claim 1, wherein the physical route protocol data unit size is selected from the set comprising 4, 8, 12, 16, 20, 56 and 60 octets.

3. A method in accordance with claim 2, wherein the virtual path protocol data unit size is selected from the set comprising 3, 6, 10, 14 and 18 octets.

4. A method in accordance with claim 3, wherein the virtual path protocol data unit size is selected from the set comprising 2, 5, 13 and 17 octets.

5. A method in accordance with claim 4, wherein the circuit connection protocol data unit size is selected from the set comprising 1, 4, 8, 12 and 16 octets.

6. A method in accordance with claim 5, wherein the virtual channel protocol data units of at least two cells that share the same path at the virtual path layer are stored as user data in a virtual path protocol data unit cell.

7. A method in accordance with claim 6, wherein the user data of the virtual channel protocol data unit cell is stored as user data in a physical route protocol data unit cell having any of the sizes 4, 8, 12, 16 and 20 octets.

8. A method in accordance with claim 7, wherein the virtual channel protocol data units of at least two cells that share the same virtual path, or the same virtual path/virtual channel for an ATM-connection, are stored in the 48 octets payload of an ATM-cell.

9. A method in accordance with claim 8, wherein said ATM-cell having stored therein virtual channel protocol data units in its turn is stored as user data in a physical route protocol data unit cell having the size of 56 or 60 octets.

10. A method in accordance with claim 4, wherein at the far end of said common virtual path layer path said virtual channel protocol data units are extracted from said time slots and are redirected to their respective destinations.

11. Circuit emulating ATM switch node for switching synchronous transfer mode cells in a circuit emulated switch, said switch node comprising a central switch with inlet ports and outlet ports, local access switches, local access units connected to each of the local access switches and users connected to each of the local access units by means of a frame oriented time slot bus, each user being associated with a time slot that has a predetermined position in successive frames, said access units having cell assembly means for encapsulating incoming time slots from its connected users in cells according to the basic principle for circuit emulation and cell disassembly means for disassembling time slots of incoming cells and for restoring the time relationship of the time slots thus dissembled on a frame oriented basis wherein mapping units are connected between the central switch and the access switches, each said mapping unit being provided with:

means for extracting from incoming cells (a) the time slots and (b) an identifier which is associated with the time slots of an individual cell and which identifies the original of its associated time slots, means for putting the extracted time slots together with their associated identifier into the time slots of a new cell larger than each of the incoming cells, and means for dispatching the larger cell.

12. Circuit emulated ATM switch in accordance with claim 11, said cell assembly unit comprises a time slot counter, a time slot store comprising as many locations as there are time slots in a frame, a connection data record and control module and a multiplexor for the assembly of incoming time slots with a header into an outgoing cell wherein each location of the time slot store comprises a qualifier stating if user data is to be put in a time slot or not and if the control module shall be invoked or not, and in that the connection data record and control module comprises a description of the cell, said description at least indicating the size of the cell, the read address of the time slot store and the cell header.

13. Circuit emulated ATM switch in accordance with claim 12, wherein the connection data record and control module comprises a cell description table having a number of locations, each location having the same size as the cell to be assembled and comprising two main parts, the first part containing cell header data, virtual path layer protocol data units, the second part containing a pattern for the user data to be put into the time slots and a value the significance of which is determined by an associated qualifier.

14. Circuit emulated ATM switch in accordance with claim 13, wherein the significance of the value stored in the user data part of said location in the cell description table is either a pointer to the address in the time slot store at which said user data are to be stored or a virtual channel identifier in the case two or more cells are to be put in one physical route protocol data unit cell the user data part of which is larger than the size of the user data of each of the cells containing said virtual channel protocol data units.

15. Circuit emulated ATM switch in accordance with claim 11, wherein the central switch is a spatial switch wherein said circuit emulated ATM switch further comprises, means for routing incoming cells according to their physical route identifier PRI contained in said physical route protocol control information part, means for distinguishing between different cell sizes and means for changing said physical route identifier to a new one which indicates the destination of the outgoing cell.

16. Circuit emulated ATM switch in accordance with claim 15, wherein said means for routing incoming cells according to their physical route identifier is provided at each inlet and outlet port of the central switch, said means for routing incoming cells comprising a cell size counter, a physical route conversion table, control means and a multiplexor, and at each outlet port of the switch a cell size decoder and a cell size counter.

17. Circuit emulated ATM switch in accordance with claim 16, wherein said means for distinguishing between different cell sizes comprises a cell size counter reading the cell size from the header of the incoming cell.

18. Circuit emulated ATM switch in accordance with claim 17, wherein said means for changing said physical route identifier to a new one which indicates the destination of the outgoing cell comprises a conversion table for converting the physical route identifier of an incoming cell into a new physical route identifier indicating the destination of the outgoing cell.

19. Circuit emulated ATM switch in accordance with claim 11, wherein each mapper unit comprises:
- input buffer means for temporarily storing an input cell while its header is analyzed,
- means for bridging an incoming cell at the physical route layer,
- means for bridging an incoming cell at the virtual path layer,
- means for bridging an incoming cell at the virtual channel layer, and
- means for bridging from the virtual path layer up to the virtual channel layer,
- main multiplexor means,
- multiplexor selector control means, and
- output buffer means for temporarily storing a new cell until it is dispatched, said new cell comprising at least the user data of the cell in the input buffer means.

20. Circuit emulated ATM switch in accordance with claim 19, wherein said means for bridging an incoming cell at the physical route layer comprises physical route table means and a physical route layer multiplexor means, said physical route table means comprising a number of locations for storing values, each location being associated with a qualifier for indicating the significance of its associate value which is either a new physical route protocol data control information value, representing bridging at the physical route layer, or a virtual path pointer indicating further processing of the incoming cell at a higher protocol layer.

21. Circuit emulated ATM switch in accordance with claim 20, wherein said means for bridging an incoming cell at the virtual path layer comprises virtual path table means for virtual path layer multiplexor means, said virtual path table means comprising a number of locations for storing values, each location being associated with a qualifier for indicating the significance of its associated value which is either a new virtual path rotocol control information value, representing bridging at the virtual path layer, or a virtual channel pointer indicating further processing of the incoming cell at the virtual channel layer.

22. Circuit emulated ATM switch in accordance with claim 21, wherein said means for bridging an incoming cell at the virtual channel layer and said means for bridging from the virtual path layer up to the virtual channel layer comprising:
- a number of fifos able to hold a number of virtual channel protocol data units, each such being associated with a respective outgoing virtual path at the virtual path layer,
- virtual channel layer multiplexor means, and
- virtual channel table means comprising a number of locations for storing values, each location being associated with a qualifier for indicating the significance of its associated value which is either new physical route protocol control information, virtual path protocol control information and virtual channel protocol control information values, representing bridging at the virtual channel layer, or a pointer to the cell collection fifo associated with the physical route protocol control information and virtual path protocol control information values of the incoming cell, indicating that a number of virtual channel protocol data units of a predefined set that has the same virtual path protocol control information value, either already are stored in said fifo or will arrive at a later time to the input fifo.

23. Circuit emulated ATM switch in accordance with claim 22, wherein said mapper unit comprises a cell size counter for reading, from the header of an incoming cell temporarily stored in said input buffer means, the number of octets making up the incoming cell and for counting the number of octets transferred from said input buffer means to said output buffer means so as to keep track of the header of the incoming cell and the user data part thereof and also to provide control information to the selector control controlling said multiplexor means at the physical route layer, virtual path layer and virtual channel layer as well as said main multiplexor means, and a virtual channel protocol data unit for counting the number of virtual channel protocol data unit cells.

24. Circuit emulated ATM switch in accordance with claim 23, wherein each local access unit comprises a cell disassembly unit for peeling off the physical route protocol control information, virtual path protocol control information and virtual channel protocol control information values of a cell, for handing over the user data contained in the time slots of an incoming cell to its respective destination user and for restoring the time slot sequence on a frame oriented basis.

25. Circuit emulated ATM switch in accordance with claim 24, wherein the cell dissembly unit comprises:
- physical route table means,
- virtual path table means,
- virtual channel table means,
- time slot store means comprising a number of positions corresponding to the number of users that are connected to the access unit, and
- time slot counter means, said physical route table means comprising locations, each such location storing a pointer to the virtual path table means associated with said location, said virtual path table means comprising locations at which a value is stored, each such location having associated therewith a qualifier identifying the significance of the value stored at its associated location, said value either indicating at least one read address to the time slot store in which case the cell at said input buffer means contains virtual channel layer user data or indicating a pointer to the virtual channel table means associated with said virtual path table location in which case the cell in the input buffer means comprises virtual channel protocol data unit cells, said pointed out virtual channel table means containing locations at each of which there is stored the write address to the time slot store at which the time slot user data of the cell at the input buffer means should be stored, said time slot counter reading the user data stored in the time slot memory position for position at a frame oriented basis.

* * * * *